(12) United States Patent
Jeong et al.

(10) Patent No.: US 9,893,934 B2
(45) Date of Patent: *Feb. 13, 2018

(54) SYSTEM AND METHOD OF CONTROLLING SURROUNDING DEVICES, BASED ON TOPOLOGY

(71) Applicant: SAMSUNG ELECTRONICS CO., LTD., Suwon-si (KR)

(72) Inventors: Hee-seok Jeong, Suwon-si (KR); Yong-jin Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/257,299

(22) Filed: Sep. 6, 2016

(65) Prior Publication Data

US 2016/0373296 A1 Dec. 22, 2016

Related U.S. Application Data

(63) Continuation of application No. 14/109,312, filed on Dec. 17, 2013, now Pat. No. 9,438,442.

(30) Foreign Application Priority Data

Dec. 17, 2012 (KR) .................. 10-2012-0147724
May 13, 2013 (KR) .................. 10-2013-0054008

(51) Int. Cl.
*G06F 15/16* (2006.01)
*H04L 12/24* (2006.01)
(Continued)

(52) U.S. Cl.
CPC ........ *H04L 41/0803* (2013.01); *H04L 12/282* (2013.01); *H04L 12/2809* (2013.01);
(Continued)

(58) Field of Classification Search
CPC ........... H04L 12/2827; H04L 29/08522; H04L 12/2814; H04L 41/082; H04L 2/2818; H04L 2/2832; H04L 2/2838; G05B 15/00
(Continued)

(56) References Cited

U.S. PATENT DOCUMENTS 8,095,340 B2 1/2012 Brown
8,233,090 B2 7/2012 Chun
(Continued)

FOREIGN PATENT DOCUMENTS

CN 101405707 A 4/2009
CN 101484889 A 7/2009
(Continued)

OTHER PUBLICATIONS

International Search Report (PCT/ISA/210), dated Mar. 19, 2014, issued by the International Searching Authority in counterpart International Patent Application No. PCT/KR2013/011722.
(Continued)

*Primary Examiner* — Kyung H Shin
(74) *Attorney, Agent, or Firm* — Sughrue Mion, PLLC

(57) ABSTRACT

A system and method of controlling surrounding devices, based on a topology are provided. The method of controlling sub surrounding devices, which is performed by a main surrounding device, includes receiving a plurality of pieces of surrounding device information about the sub surrounding devices from a host device; receiving context information about a context of the host device from the host device; obtaining topology setting information about topology configuration standards; determining a sub surrounding device to be comprised in a topology from among the sub surrounding devices, based on the context information and the topology setting information; connecting the main surrounding device with the host device and the sub surrounding
(Continued)

device; and controlling the sub surrounding device, based on control information received from the host device.

20 Claims, 30 Drawing Sheets

(51) Int. Cl.
  *H04L 12/28* (2006.01)
  *H04L 29/08* (2006.01)
  *G05B 15/00* (2006.01)
(52) U.S. Cl.
  CPC ...... *H04L 12/2816* (2013.01); *H04L 12/2827* (2013.01); *H04L 29/08522* (2013.01); *H04L 41/08* (2013.01); *H04L 41/082* (2013.01); *G05B 15/00* (2013.01); *H04L 12/2814* (2013.01)
(58) Field of Classification Search
  USPC .......................... 709/227, 203; 717/170, 172
  See application file for complete search history.

(56) References Cited

U.S. PATENT DOCUMENTS

| | | | |
|---|---|---|---|
| 8,533,326 | B2 | 9/2013 | Clair et al. |
| 9,215,139 | B2 | 12/2015 | Hyvarinen et al. |
| 2003/0009760 | A1 | 1/2003 | Sakamoto et al. |
| 2004/0202206 | A1 | 10/2004 | Lee |
| 2007/0226346 | A1* | 9/2007 | Hyvarinen .......... H04L 12/2827 709/227 |
| 2008/0215668 | A1 | 9/2008 | Hu |
| 2009/0083374 | A1* | 3/2009 | Saint Clair ............ G05B 15/00 709/203 |
| 2011/0173599 | A1 | 7/2011 | Ohama et al. |
| 2012/0060151 | A1* | 3/2012 | Oh ...................... H04L 12/2814 717/170 |
| 2012/0072896 | A1 | 3/2012 | Watanabe et al. |
| 2012/0158994 | A1 | 6/2012 | McNamee et al. |
| 2013/0208693 | A1 | 8/2013 | De La Forest Divonne et al. |

FOREIGN PATENT DOCUMENTS

| | | |
|---|---|---|
| CN | 102385522 A | 3/2012 |
| EP | 2466832 A1 | 6/2012 |
| JP | 2003-22224 A | 1/2003 |
| JP | 2004-280824 A | 10/2004 |
| JP | 2006-302031 A | 11/2006 |
| KR | 10-2004-0019746 A | 3/2004 |
| WO | 2010-140623 A1 | 12/2010 |
| WO | 2012/052660 A2 | 4/2012 |

OTHER PUBLICATIONS

Written Opinion (PCT/ISA/237), dated Mar. 19, 2014, issued by the International Searching Authority in counterpart International Patent Application No. PCT/KR2013/011722.

Communication, dated May 22, 2014, issued by the European Patent Office in counterpart European Patent Application No. 13197380.2.

Communication from the Japanese Patent Office dated Nov. 6, 2017, in Japanese Patent Application No. 2013-259960.

Communication dated Dec. 12, 2017 in corresponding Chinese Patent Application No. 201310757441.1.

\* cited by examiner

SYSTEM AND METHOD OF CONTROLLING SURROUNDING DEVICES, BASED ON TOPOLOGY

CROSS-REFERENCE TO RELATED APPLICATIONS

This is a continuation application of U.S. patent application Ser. No. 14/109,312, filed on Dec. 17, 2013, in the U.S. Patent and Trademark Office, which claims priority from Korean Patent Application No. 10-2012-0147724, filed on Dec. 17, 2012, and Korean Patent Application No. 10-2013-0054008, filed on May 13, 2013, in the Korean Intellectual Property Office, the disclosures of which are incorporated herein by reference in their entireties.

BACKGROUND

1. Field

Methods and apparatuses consistent with the exemplary embodiments relate to the controlling of surrounding devices based on a topology that is configured according to a context of a host device.

2. Description of the Related Art

Due to improvements in the performance of a device and its surrounding devices, the device and the surrounding devices may provide various functions. Also, due to improvements in communication technologies, the device and the surrounding devices may be connected to each other according to various topologies. Also, according to a connection relation among the device and the surrounding devices, the device and the surrounding devices may selectively perform some functions from among the various functions.

Thus, according to a context of the device, the device and appropriate surrounding devices from among the surrounding devices are required to configure a topology, and the device and the surrounding devices are required to be effectively connected to each other. Furthermore, there is a demand for a technique that allows the device and the surrounding devices included in the topology to effectively control each other.

SUMMARY

One or more exemplary embodiments include a system and method of controlling surrounding devices based on a topology by configuring the topology including a host device and the surrounding devices according to a context of the host device, whereby the surrounding devices may be effectively controlled by the host device.

One or more exemplary embodiments include a system and method of controlling surrounding devices based on a topology, whereby an application to control the surrounding devices may be effectively installed in a host device and a main surrounding device.

One or more exemplary embodiments include a system and method of controlling surrounding devices based on a topology, whereby, when the topology is changed, the surrounding devices in the changed topology may be effectively controlled.

One or more exemplary embodiments include a system and method of controlling surrounding devices based on a topology, whereby firmware of a sub surrounding device may be effectively installed in the sub surrounding device.

Additional aspects will be set forth in part in the description which follows and, in part, will be apparent from the description, or may be learned by practice of the presented exemplary embodiments.

According to a first aspect of the exemplary embodiments, there is provided a method of controlling sub surrounding devices, the method performed by a main surrounding device and including operations of receiving a plurality of pieces of surrounding device information about the sub surrounding devices from a host device; receiving context information about a context of the host device from the host device; obtaining topology setting information about topology configuration standards; determining a sub surrounding device to be included in a topology from among the sub surrounding devices, based on the context information and the topology setting information; connecting the main surrounding device with the host device and the sub surrounding device; and controlling the sub surrounding device, based on control information received from the host device.

The context information may include information about a type of content that is executed in the host device, and the topology setting information may include information about a type of a surrounding device to be included in the topology and information about connection relations among the host device, the main surrounding device, and the sub surrounding device, according to the type of the content.

The context information may include information about a type of a service to be provided by the host device, and the topology setting information may include information about a type of a surrounding device to be included in the topology and information about connection relations among the host device, the main surrounding device, and the sub surrounding device, according to the type of the service.

The context information may include information about a user of the host device, and the topology setting information may include information about a type of a surrounding device to be included in the topology and information about connection relations among the host device, the main surrounding device, and the sub surrounding device, according to the user.

The topology setting information may include information about a type of a surrounding device to be included in the topology and information about connection relations among the host device, the main surrounding device, and the sub surrounding device, according to an attribute of the main surrounding device.

The method may further include operations of receiving application information about an application to control the sub surrounding device from the host device; and installing the application in the main surrounding device, based on the application information, and the operation of controlling the sub surrounding device may include an operation of controlling the sub surrounding device by using the application.

The topology setting information may be information about the topology configuration standards used in configuring the topology according to functions of the main surrounding device and the sub surrounding device, and the sub surrounding device to be included in the topology may be determined according to the functions of the main surrounding device and the sub surrounding device.

The method may further include operations of, when the sub surrounding device around the host device is changed, checking a topology including the changed sub surrounding device; connecting with the changed sub surrounding device, based on the topology including the changed sub surrounding device; and controlling the changed sub surrounding device.

The method may further include operations of receiving firmware of the sub surrounding device which corresponds to a function of the sub surrounding device from the host device; and providing the firmware to the sub surrounding device, wherein the main surrounding device receives the firmware from the server via the host device.

The function of the sub surrounding device may be determined based on connection relations among the host device, the main surrounding device, and the sub surrounding device.

According to a second aspect of the exemplary embodiments, there is provided a method of controlling surrounding devices, the method performed by a host device and including operations of scanning the surrounding devices; determining a main surrounding device and a sub surrounding device from among the surrounding devices, based on topology configuration standards matching a context of the host device; connecting the main surrounding device, the sub surrounding device, and the host device, based on the topology configuration standards; and controlling the main surrounding device and the sub surrounding device by the host device.

The context of the host device may include a type of content that is executed in the host device, and the topology configuration standards may include standards about a type of a surrounding device to be included in a topology and standards about connection relations among the host device, the main surrounding device, and the sub surrounding device, according to the type of the content.

The context of the host device may include a type of a service to be provided by the host device, and the topology configuration standards may include standards about a type of a surrounding device to be included in a topology and standards about connection relations among the host device, the main surrounding device, and the sub surrounding device, according to the type of the service.

The context of the host device may include a user of the host device, and the topology configuration standards may include standards about a type of a surrounding device to be included in a topology and standards about connection relations among the host device, the main surrounding device, and the sub surrounding device, according to the user.

The topology configuration standards may include standards about a type of a surrounding device to be included in a topology and standards about connection relations among the host device, the main surrounding device, and the sub surrounding device, according to an attribute of the main surrounding device.

The method may further include operations of receiving an application to control the main surrounding device from a server; and installing the application to control the main surrounding device in the host device, and the main surrounding device may be controlled by the host device, based on the application.

The method may further include an operation of providing application information about an application to control the sub surrounding device to the main surrounding device, wherein the application to control the sub surrounding device is installed in the main surrounding device, based on the application information.

The topology configuration standards may be used in configuring a topology according to functions of the main surrounding device and the sub surrounding device, and the sub surrounding device to be included in the topology may be determined according to the functions of the main surrounding device and the sub surrounding device.

The method may further include operations of, when the sub surrounding device around the host device is changed, checking a topology including the changed sub surrounding device; and connecting the main surrounding device and the changed sub surrounding device, based on the topology including the changed sub surrounding device.

The method may further include operations of receiving firmware of the sub surrounding device which corresponds to a function of the sub surrounding device from the host device; and providing the firmware to the main surrounding device, wherein the firmware is provided from the main surrounding device to the sub surrounding device.

The function of the sub surrounding device may be determined based on connection relations among the host device, the main surrounding device, and the sub surrounding device.

According to a third aspect of the exemplary embodiments, there is provided a method of controlling a surrounding device, the method performed by a host device and including operations of transmitting context information about a context of the host device to the surrounding device; in response to a connection request from the surrounding device, connecting the surrounding device and the host device; and controlling the surrounding device, wherein the surrounding device determines whether to transmit the connection request to the host device, based on the context information of the host device and topology configuration standards that are provided to the surrounding device from a server; and the surrounding device is determined as a main surrounding device or a sub surrounding device, based on the context information and the topology configuration standards.

According to a fourth aspect of the exemplary embodiments, there is provided a method of controlling a surrounding device, the method performed by a host device and including operations of requesting a server for firmware of a sub surrounding device connected to a main surrounding device connected to the host device according to a topology; receiving the firmware from the server; and providing the firmware to the sub surrounding device, wherein the requesting of the server includes providing to the server at least one of information about a connection relation of the sub surrounding device and information about a function of the sub surrounding device connected to the main surrounding device, and wherein the firmware that is provided to the sub surrounding device is used by the sub surrounding device so as to control an operation of the sub surrounding device, in response to a control command from the host device or the main surrounding device.

According to a fifth aspect of the exemplary embodiments, there is provided a surrounding device control system including a host device scanning surrounding devices and determining a main surrounding device and sub surrounding devices from among the scanned surrounding devices; the host device providing a plurality of pieces of surrounding device information about the sub surrounding devices and context information about a context of the host device to the main surrounding device; a server providing topology setting information about topology configuration standards to the main surrounding device; the main surrounding device selecting at least one of the sub surrounding devices, based on the plurality of pieces of surrounding device information, the context information, and the topology setting information; the main surrounding device connecting the main surrounding device and the selected sub surrounding device; and the main surrounding device controlling the selected sub surrounding device.

According to a sixth aspect of the exemplary embodiments, there is provided a host device including a memory for storing at least one program; and a processor for configuring a topology with surrounding devices and controlling the surrounding devices by executing the at least one program, wherein the at least one program includes commands for scanning the surrounding devices; determining a main surrounding device and a sub surrounding device from among the surrounding devices, based on topology configuration standards matching a context of the host device; connecting the main surrounding device, the sub surrounding device, and the host device, based on the topology configuration standards; and controlling the main surrounding device and the sub surrounding device.

The context of the host device may include a type of content that is executed in the host device, and the topology configuration standards may include standards about a type of a surrounding device to be included in a topology and standards about connection relations among the host device, the main surrounding device, and the sub surrounding device, according to the type of the content.

The context of the host device may include a type of a service to be provided by the host device, and the topology configuration standards may include standards about a type of a surrounding device to be included in a topology and standards about connection relations among the host device, the main surrounding device, and the sub surrounding device, according to the type of the service.

The context of the host device may include a user of the host device, and the topology configuration standards may include standards about a type of a surrounding device to be included in a topology and standards about connection relations among the host device, the main surrounding device, and the sub surrounding device, according to the user.

The topology configuration standards may include standards about a type of a surrounding device to be included in a topology and standards about connection relations among the host device, the main surrounding device, and the sub surrounding device, according to an attribute of the main surrounding device.

The at least one program further includes commands for receiving an application to control the main surrounding device from a server; and installing the application to control the main surrounding device in the host device, and the main surrounding device may be controlled by the host device, based on the application.

The at least one program may further include commands for providing application information about an application to control the sub surrounding device to the main surrounding device, and the application to control the sub surrounding device may be installed in the main surrounding device, based on the application information.

The topology configuration standards may be used in configuring a topology according to functions of the main surrounding device and the sub surrounding device, and the sub surrounding device to be included in the topology may be determined according to the functions of the main surrounding device and the sub surrounding device.

The at least one program may further include commands for, when the sub surrounding device around the host device is changed, checking a topology including the changed sub surrounding device; and connecting the main surrounding device and the changed sub surrounding device, based on the topology including the changed sub surrounding device.

The at least one program may further include commands for receiving firmware of the sub surrounding device which corresponds to a function of the sub surrounding device from the host device; and providing the firmware to the main surrounding device, and the firmware may be provided from the main surrounding device to the sub surrounding device.

The function of the sub surrounding device may be determined based on connection relations among the host device, the main surrounding device, and the sub surrounding device.

According to a seventh aspect of the exemplary embodiments, there is provided a non-transitory computer-readable recording medium having recorded thereon a program which, when executed by a computer, performs the method of the first aspect of the exemplary embodiments.

According to an eighth aspect of the exemplary embodiments, there is provided a non-transitory computer-readable recording medium having recorded thereon a program which, when executed by a computer, performs the method of the second aspect of the exemplary embodiments.

According to a ninth aspect of the exemplary embodiments, there is provided a non-transitory computer-readable recording medium having recorded thereon a program which, when executed by a computer, performs the method of the third aspect of the exemplary embodiments.

According to a tenth aspect of the exemplary embodiments, there is provided a non-transitory computer-readable recording medium having recorded thereon a program which, when executed by a computer, performs the method of the fourth aspect of the exemplary embodiments.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION OF EXEMPLARY EMBODIMENTS

Figure 1:
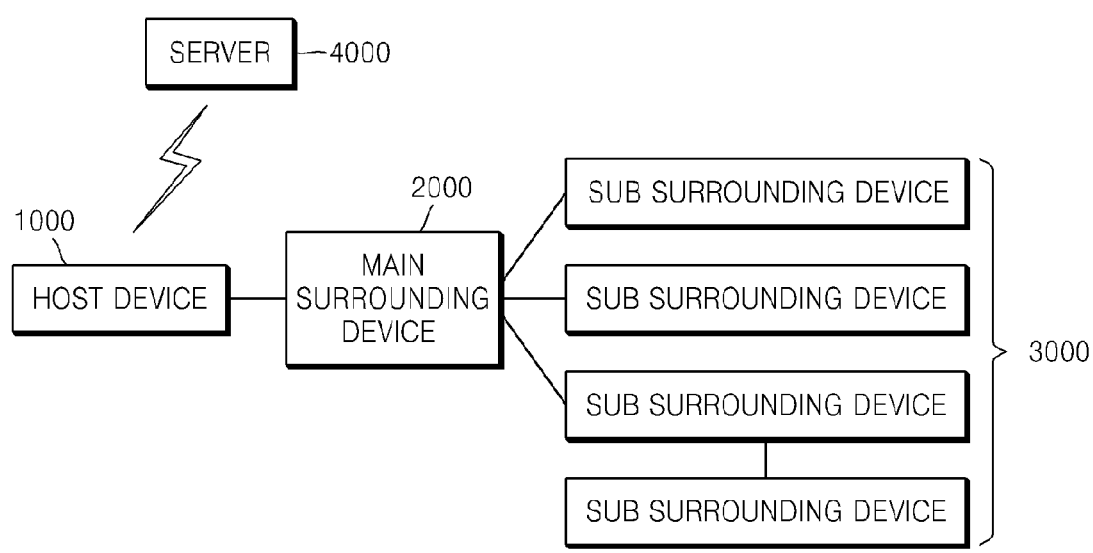
FIG. 1 is a diagram of a surrounding device control system for controlling surrounding devices around a host device according to an exemplary embodiment.

Hereinafter, exemplary embodiments will be described more fully with reference to the accompanying drawings. However, the exemplary embodiments o may be embodied in many different forms and should not be construed as being limited to the exemplary embodiments set forth herein; rather, these exemplary embodiments are provided so that this disclosure will be thorough and complete, and will fully convey the concept of the exemplary embodiments to those of ordinary skill in the art. In the following description, well-known functions or constructions will not be described in detail so as not to obscure the exemplary embodiments with unnecessary detail. Also, throughout the specification, like reference numerals in the drawings denote like elements.

Throughout the specification, it will also be understood that when an element is referred to as being "connected to" another element, it can be directly connected to the other element, wirelessly connected to the other element, or electrically connected to the other element while intervening elements may also be present.

Throughout the specification, the term "topology" means the arrangement of devices (or nodes). The topology may include a physical topology and a logical topology. That is, the topology may be defined according to physical or logical connections between the devices that belong to a topology structure. For example, different topologies may be defined by at least one of a cooperative relationship between the devices, a method of connecting the devices, a data transmission speed between the devices, a flow of data exchanged between the devices, a type of a signal exchanged between the devices, and a type of an application installed in each of the devices, but examples of the topologies are not limited thereto.

Also, throughout the specification, a topology may include a host device, a main surrounding device, and at least one sub surrounding device. The host device may be connected to the main surrounding device, and the main surrounding device may be connected to the at least one sub surrounding device. Also, at least one of the host device and the main surrounding device may control the at least one sub surrounding device.

Throughout the specification, the host device, the main surrounding device, and the sub surrounding device that configure the topology may be defined according to a position of a device, and a role of the device with respect to another device. Therefore, the device may operate as at least one of the host device, the main surrounding device, and the sub surrounding device in the configured topology.

Also, at least one of the host device, the main surrounding device, and the sub surrounding device may include, but is not limited to, a smart phone, a mobile phone, a personal digital assistant (PDA), a laptop computer, a media player, a personal computer (PC), a global positioning system (GPS) apparatus, and other mobile or non-mobile computing devices. Also, at least one of the host device, the main surrounding device, and the sub surrounding device may include household appliances and various in-house devices such as a television (TV), a lighting fixture, a refrigerator, audio equipment, a washing machine, an oven, a gas range, a home gateway, a game player, an electronic board, and a touch table, but examples of the household appliances and various in-house devices are not limited thereto.

Throughout the specification, a context of the host device may be related to at least one of an operation of the host device, a user of the host device, a surrounding environment of the host device, and an attribute of the host device. For example, the context of the host device may be determined according to a type of content that is executed in the host device, a type of a service that is provided by the host device, the user of the host device, or the attribute of the host device. Also, the context of the host device may be determined according to a position of the host device, weather or temperature of a place where the host device is positioned, motion of the host device, or the like. However, examples of the context of the host device are not limited thereto.

As used herein, the term "and/or" includes any and all combinations of one or more of the associated listed items. Expressions such as "at least one of," when preceding a list of elements, modify the entire list of elements and do not modify the individual elements of the list.

FIG. 1 is a diagram of a surrounding device control system for controlling surrounding devices around a host device 1000, according to an exemplary embodiment.

As illustrated in FIG. 1, the surrounding device control system may include the host device 1000, at least one main surrounding device 2000, one or more sub surrounding devices 3000, and a server 4000.

In the surrounding device control system according to the present exemplary embodiment, a topology may be defined according to a context of the host device 1000, and according to the topology, the host device 1000, the main surrounding device 2000, and the sub surrounding devices 3000 may be determined.

The host device 1000, the main surrounding device 2000, and the sub surrounding devices 3000 may be connected to each other according to the topology, and at least one of the host device 1000 and the main surrounding device 2000 may control the sub surrounding devices 3000. However, one or more exemplary embodiments are not limited thereto, and thus, the sub surrounding devices 3000 may control the host device 1000 or the main surrounding device 2000.

The host device 1000, the main surrounding device 2000, and the sub surrounding devices 3000 may be connected in a wired or wireless manner. For example, the host device 1000, the main surrounding device 2000, and the sub surrounding devices 3000 may be connected to each other by using at least one of communication methods including Wi-Fi, Bluetooth, Bluetooth Low Energy (BLE), Near Field Communication (NFC), and Radio Frequency Identification (RFID), but one or more exemplary embodiments are not limited thereto. Also, the host device 1000, the main surrounding device 2000, and the sub surrounding devices 3000 may be connected to each other via High Definition Multimedia Interface (HDMI) cables, RGB cables, or sockets, but one or more exemplary embodiments are not limited thereto.

Figure 2:
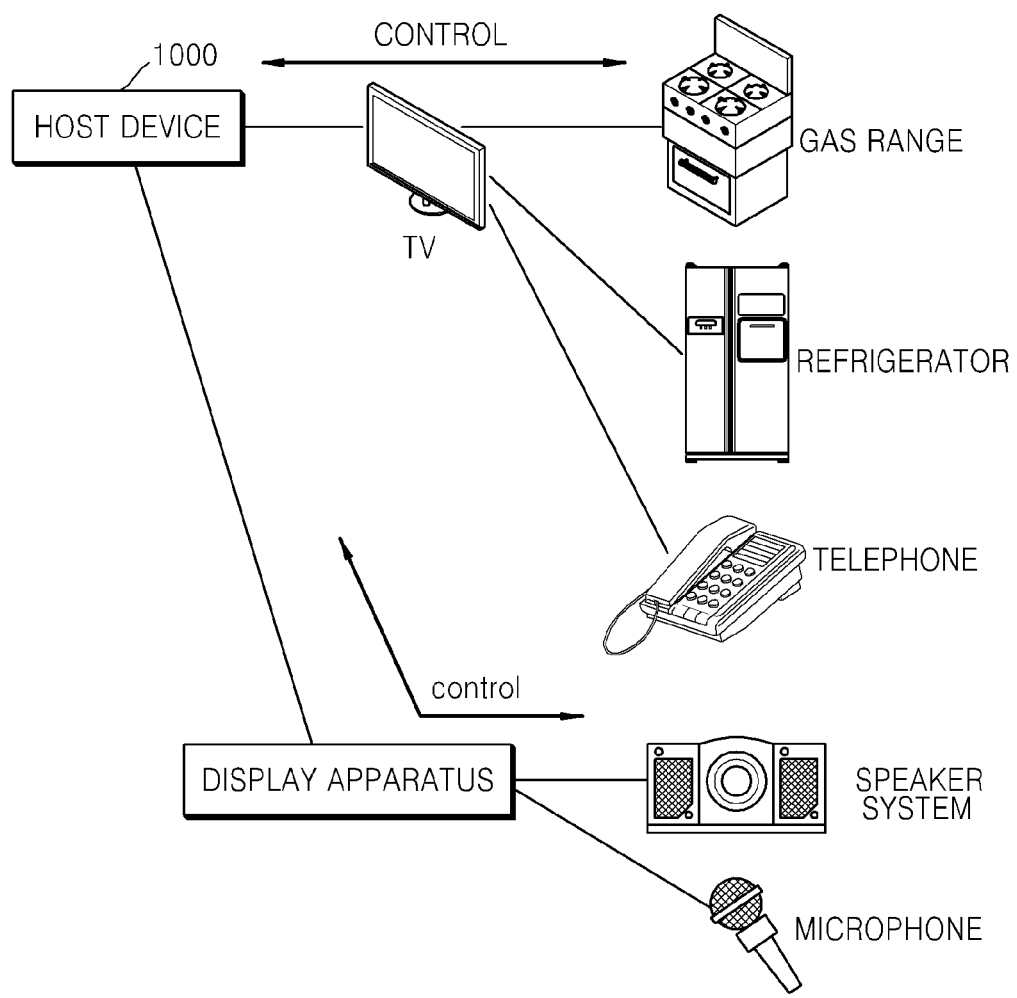
FIG. 2 illustrates an example of the surrounding device control system according to the present exemplary embodiment.

FIG. 2 illustrates an example of the surrounding device control system according to the present exemplary embodiment.

The host device 1000, the main surrounding device 2000, and the sub surrounding device 3000 may be determined according to a context of the host device 1000. In more detail, the host device 1000 may scan one or more surrounding devices around the host device 1000, and may determine the main surrounding device 2000 and the sub surrounding device 3000 from among the one or more scanned surrounding devices, according to the context of the host device 1000.

Referring to FIG. 2, the main surrounding device 2000 connected to the host device 1000 may include a TV and a display apparatus, and the sub surrounding device 3000 may include a gas range, a refrigerator, a telephone, a speaker system, and a microphone. For example, the TV may be connected to the host device 1000, the gas range, the refrigerator, and the telephone, and the display apparatus may be connected to the host device 1000, the speaker system, and the microphone.

The host device 1000 or the TV may control the gas range, the refrigerator, and the telephone, and the host device 1000 or the display apparatus may control the speaker system and the microphone.

For example, when the host device 1000 enters a house, the host device 1000 or the TV may change a mode of the telephone into a vibration mode. Also, when the telephone receives an incoming call, the telephone controls the TV to display caller information on a screen of the TV.

Figure 3:
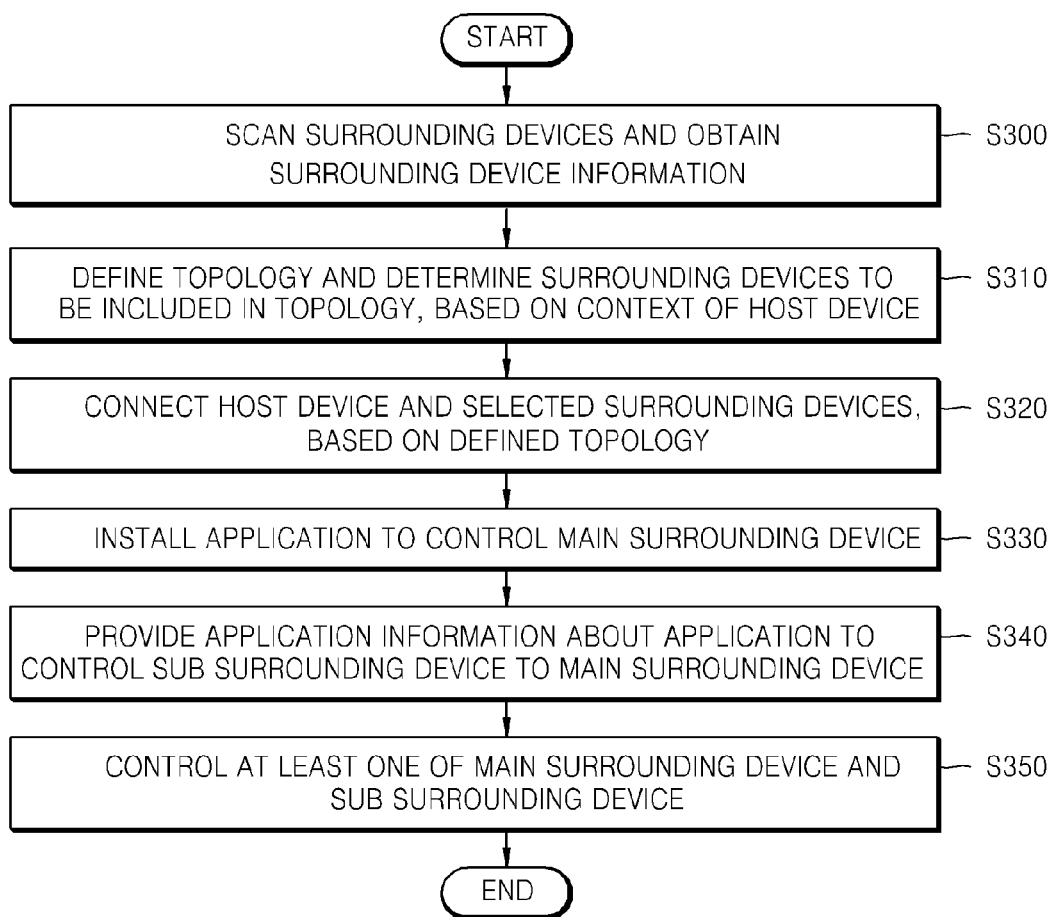
FIG. 3 is a flowchart of a method of controlling a main surrounding device and at least one sub surrounding device, which is performed by the host device, according to an exemplary embodiment.

FIG. 3 is a flowchart of a method of controlling the main surrounding device 2000 and the sub surrounding device 3000, which is performed by the host device 1000, according to an exemplary embodiment.

In operation S300, the host device 1000 scans one or more surrounding devices around the host device 1000 and obtains a plurality of pieces of surrounding device information about the scanned surrounding devices. The host device 1000 may receive identifier values (ID values, e.g., service set identifiers (SSIDs)) of the surrounding devices from the surrounding devices, and may obtain the surrounding device information from the server 4000, based on the ID values of the surrounding devices.

The host device 1000 may scan the surrounding devices by using at least one of NFC, ZigBee communication, RFID communication, Ultra Wide Band (UWB) communication, and Bluetooth communication, but the one or more exemplary embodiments are not limited thereto.

The surrounding device information may include, but is not limited to, information about a function of each surrounding device, information about a communication method that is usable with respect to each surrounding device, connection information for connection with each surrounding device, application information about one or more applications installed in each surrounding device, application information about an application to control each surrounding device, and information about a control command of each surrounding device.

In operation S310, the host device 1000 defines a topology and determines the surrounding devices to be included in the topology, based on a context of the host device 1000.

The context of the host device 1000 may be related to at least one of an operation of the host device 1000, a user of the host device 1000, a surrounding environment of the host device 1000, and an attribute of the host device 1000. For example, the context of the host device 1000 may be determined according to a type of content that is executed in the host device 1000, a type of a service that is provided by the host device 1000, the user of the host device 1000, or the attribute of the host device 1000. Also, the context of the host device 1000 may be determined according to a position of the host device 1000, weather or temperature of a place where the host device 1000 is positioned, motion of the host device 1000, or the like. However, examples of the context of the host device 1000 are not limited thereto.

The host device 1000 may obtain topology setting information about topology configuration standards from the server 4000, and may select the topology based on the topology setting information, the surrounding devices, and the context of the host device 1000. Also, the host device 1000 may select the main surrounding device 2000 and the sub surrounding device 3000 to be included in the topology from the scanned surrounding devices. For example, when the host device 1000 attempts to reproduce a moving picture, the host device 1000 may select the main surrounding device 2000 and the sub surrounding device 3000 from among surrounding devices related to reproduction of the moving picture, based on the topology setting information obtained from the server 4000. However, one or more exemplary embodiments are not limited thereto, and thus, the host device 1000 may determine a topology configuration standard based on a user input, and then may generate topology setting information. In this case, a user interface (UI) for setting of the topology configuration standard may be separately displayed by the host device 1000.

In the present exemplary embodiment, the host device 1000 first scans the surrounding devices and then selects the surrounding devices, which are to be included in the topology, from among the scanned surrounding devices, but the one or more exemplary embodiments are not limited thereto. That is, the host device 1000 may first determine the context of the host device 1000 and then may scan surrounding devices related to the context of the host device 1000. Alternatively, the host device 1000 may first define a topology related to the context of the host device 1000 and then may scan surrounding devices related to the defined topology.

The host device 1000 may provide a plurality of pieces of surrounding device information about the scanned surrounding devices and context information about the context of the host device 1000 to the server 4000, and then the server 4000 may define a configuration-target topology and may determine the main surrounding device 2000 and the sub surrounding device 3000 based on the surrounding device information and the context information about the context of the host device 1000. In this case, the host device 1000 may receive a plurality of pieces of information about the topology, the main surrounding device 2000, and the sub surrounding device 3000 that are determined by the server 4000, but one or more exemplary embodiments are not limited thereto.

In operation S320, the host device 1000 connects the host device 1000 and the selected surrounding devices, based on the defined topology. The host device 1000 may connect the selected surrounding devices to the host device 1000, based on the defined topology.

Also, the host device 1000 may control the main surrounding device 2000 and the sub surrounding device 3000 to be connected to each other, based on the defined topology. In this case, the host device 1000 may provide connection information of the main surrounding device 2000 to the sub surrounding device 3000 or may provide connection information of the sub surrounding device 3000 to the main surrounding device 2000, but one or more exemplary embodiments are not limited thereto.

In operation S330, the host device 1000 installs an application to control the main surrounding device 2000. The host device 1000 may obtain the application to control the main surrounding device 2000 from the server 4000, based on an ID value of the main surrounding device 2000. Also, the host device 1000 may install the obtained application in the host device 1000.

In operation S340, the host device 1000 provides, to the main surrounding device 2000, application information about an application to control the sub surrounding device 3000. The host device 1000 may obtain the application information about the application to control the sub surrounding device 3000 from the server 4000, based on an ID value of the sub surrounding device 3000. The application information about the application to control the sub surrounding device 3000 may include, but is not limited to, link information about a link for downloading an application file.

Also, the host device 1000 may provide the application information to the main surrounding device 2000, and the main surrounding device 2000 may install the application in the main surrounding device 2000 to control the sub surrounding device 3000 based on the application information.

In operation S350, the host device 1000 controls at least one of the main surrounding device 2000 and the sub surrounding device 3000. The host device 1000 may control the main surrounding device 2000 to control the sub surrounding device 3000. Also, the host device 1000 may directly control the main surrounding device 2000 and the sub surrounding device 3000. However, one or more exemplary embodiments are not limited thereto.

The host device 1000 may provide application information about an application to control the host device 1000 to at least one of the main surrounding device 2000 and the sub surrounding device 3000. Also, the host device 1000 may provide application information about an application to control the main surrounding device 2000 to the sub surrounding device 3000. In this case, the main surrounding device 2000 may control the host device 1000, or the sub surrounding device 3000 may control at least one of the host device 1000 and the main surrounding device 2000.

Figure 4:
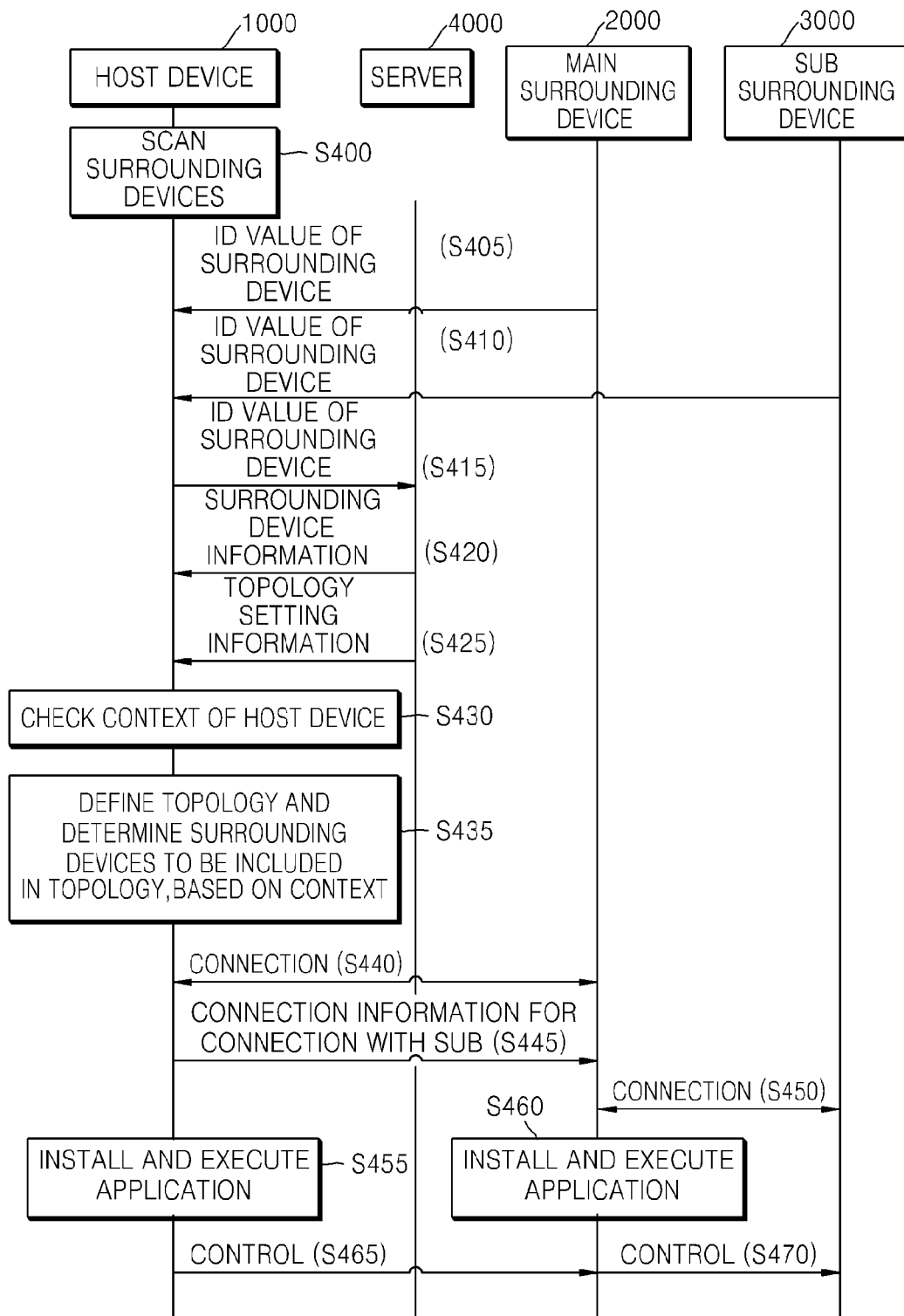
FIG. 4 is a flowchart of a method of selecting the main surrounding device and the sub surrounding device according to a context of the host device, and controlling the main surrounding device and the sub surrounding device, which is performed by the host device, according to an exemplary embodiment.

FIG. 4 is a flowchart of a method, performed by the host device 1000, of selecting the main surrounding device 2000 and the sub surrounding device 3000 according to a context of the host device 1000, and controlling the main surrounding device 2000 and the sub surrounding device 3000 according to an exemplary embodiment.

In operation S400, the host device 1000 scans one or more surrounding devices. The host device 1000 may scan the surrounding devices by using at least one of NFC, ZigBee communication, RFID communication, UWB communication, and Bluetooth communication. However, the method of scanning the devices is not limited thereto.

In operations S405 and S410, the host device 1000 receives ID values from the surrounding devices. The ID value of each of the surrounding devices may include, but is not limited to, an SSID and a model number.

In operation S415, the host device 1000 provides the ID values of the surrounding devices to the server 4000.

In operation S420, the server 4000 provides a plurality of pieces of surrounding device information about the surrounding devices to the host device 1000. The server 4000 may obtain the plurality of pieces of surrounding device information about the surrounding devices from a database (DB) (not shown) in the server 4000 or from an external server (not shown), based on the ID values of the surrounding devices. The surrounding device information may include, but is not limited to, information about a function of each surrounding device, information about a communication method used by each surrounding device, connection information for connection with each surrounding device, application information about one or more applications installed in each surrounding device, application information about an application to control each surrounding device, and information about a control command of each surrounding device.

In operation S425, the server 4000 provides topology setting information to the host device 1000. The topology setting information may be information about topology configuration standards, and may be used in determining surrounding devices to be included in a topology and determining a connection relation among the host device 1000 and the surrounding devices. The topology setting information may include information about how to configure a topology according to a context of the host device 1000, and the surrounding devices around the host device 1000.

In operation S430, the host device 1000 checks the context of the host device 1000. The host device 1000 may check at least one of a type of content that is executed in the host device 1000, a type of a service that is provided by the host device 1000, a user of the host device 1000, an attribute of the host device 1000, and an environment of the host device 1000.

For example, the host device 1000 may check whether a moving picture is reproduced in the host device 1000 or music is reproduced in the host device 1000. Also, the host device 1000 may check the resolution of the moving picture that is reproduced in the host device 1000, and a type of codec used to reproduce the moving picture. The host device 1000 may also check whether the moving picture that is reproduced in the host device 1000 is stored in the host device 1000 or in an external server (not shown).

The host device 1000 may check at least one of a power management service, a home theater service, a game service, a TV watching service, a chatting service, a document writing service, a search service, a phone service, and a moving picture reproduction service, as the service provided by the host device 1000.

The host device 1000 may check whether the user of the host device 1000 is a parent or a child, and may verify a service usage right of the user of the host device 1000 based on the determination that the user is a parent or a child.

The host device 1000 may check whether the host device 1000 is a public device or a private device. For example, the public device may be used by all family members, and the private device may be used by specific family members, but one or more exemplary embodiments are not limited thereto.

The host device 1000 may check a position of the host device 1000, weather, time, intensity of light around the host device 1000, and motion of the host device 1000, as the environment of the host device, but one or more exemplary embodiments are not limited thereto.

In operation S435, the host device 1000 may define a topology and may determine surrounding devices to be included in the topology, based on the checked context. The host device 1000 may define the topology and may select the surrounding devices to be included in the topology from among the scanned surrounding devices, based on the topology setting information and the context of the host device 1000. Also, the host device 1000 may determine the main surrounding device 2000 and the sub surrounding device 3000 from among the scanned surrounding devices.

In this case, the host device 1000 may recommend, to the user, the topology that includes the surrounding devices related to the context of the host device 1000 from among the scanned surrounding devices, or the host device 1000 may determine the topology and the surrounding devices to be included in the topology, according to a user input. For example, when the host device 1000 reproduces a moving picture, the host device 1000 may recommend a topology to the user so as to allow the host device 1000 to be connected to a TV (as the main surrounding device 2000), and the TV (i.e., the main surrounding device 2000) to be connected to a speaker system (i.e., the sub surrounding device 3000) and a lighting fixture (i.e., the sub surrounding device 3000).

In operation S440, the host device 1000 connects with the main surrounding device 2000. In this case, the host device 1000 may previously obtain connection information for connection with the main surrounding device 2000 from the main surrounding device 2000 or the server 4000.

In operation S445, the host device 1000 provides connection information for connection with the sub surrounding device 3000 to the main surrounding device 2000. In this case, the host device 1000 may previously obtain the connection information for connection with the sub surrounding device 3000 from the sub surrounding device 3000 or the server 4000.

In operation S455, the host device 1000 installs and executes an application to control the main surrounding device 2000. The host device 1000 may previously obtain application information about the application to control the main surrounding device 2000 from the main surrounding device 2000 or the server 4000, and may install the application to control the main surrounding device 2000 in the host device 1000. The application information may include an application file and link information for downloading the application file. If the application to control the main surrounding device 2000 is already installed in the host device 1000, the host device 1000 may execute the application to control the main surrounding device 2000 without a separate installation process.

In operation S460, the main surrounding device 2000 installs and executes an application to control the sub surrounding device 3000. The main surrounding device 2000 may previously obtain application information about the application to control the sub surrounding device 3000 from the host device 1000 or the server 4000, and may install the application to control the sub surrounding device 3000 in the main surrounding device 2000. In a case where the main surrounding device 2000 obtains the application information about the application to control the sub surrounding device 3000 from the host device 1000, the host device 1000 may previously obtain the application information about the application to control the sub surrounding device 3000 from the sub surrounding device 3000 or the server 4000.

If the application to control the sub surrounding device 3000 is already installed in the main surrounding device 2000, the main surrounding device 2000 may execute the application to control the sub surrounding device 3000 without a separate installation process.

In operation S465, the host device 1000 controls the main surrounding device 2000, and in operation S470, the main surrounding device 2000 controls the sub surrounding device 3000. The main surrounding device 2000 may control the sub surrounding device 3000, based on a command from the host device 1000, but one or more exemplary embodiments are not limited thereto.

Figure 5:
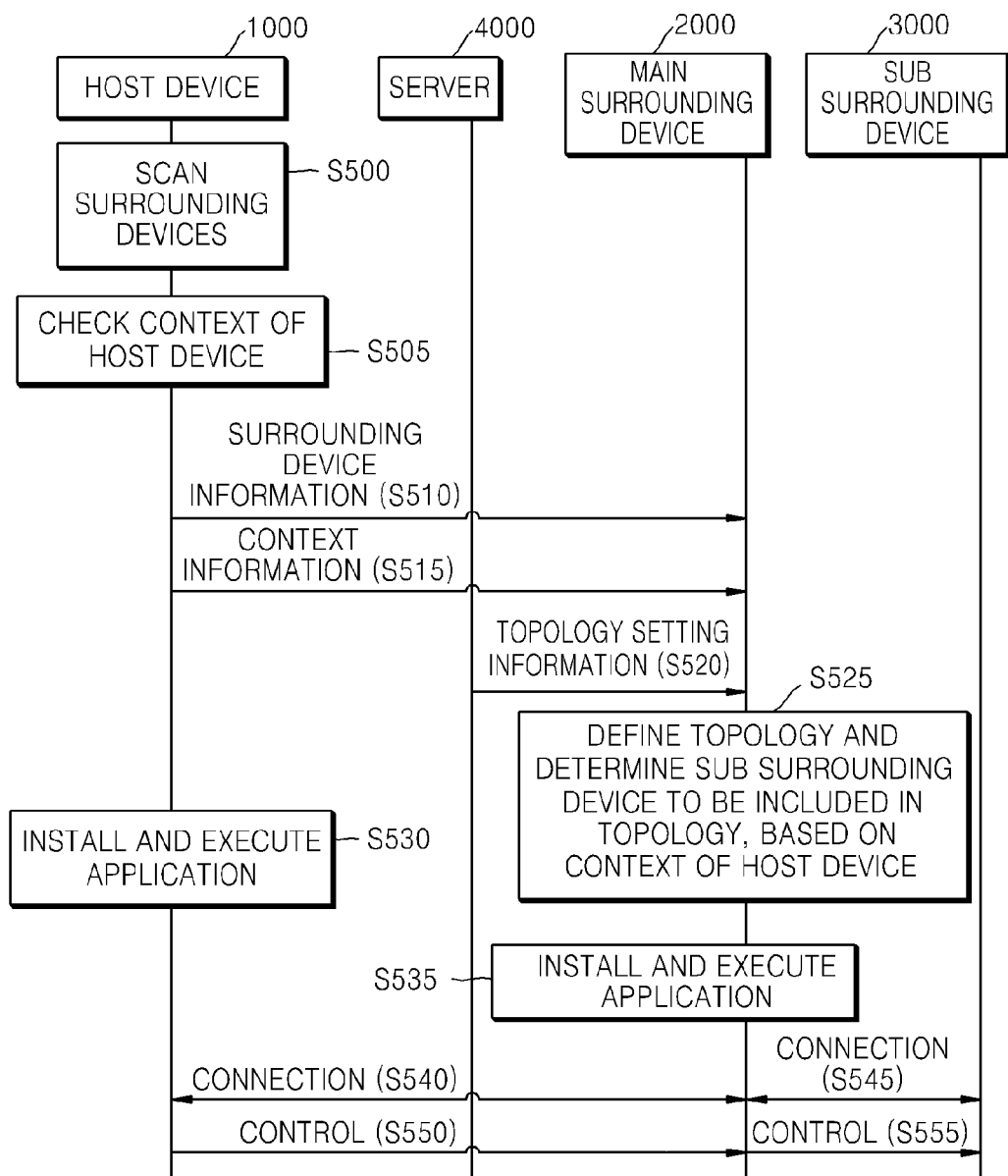
FIG. 5 is a flowchart of a method of selecting the sub surrounding device according to a context of the host device, and controlling the sub surrounding device, which is performed by the main surrounding device, according to an exemplary embodiment.

FIG. 5 is a flowchart of a method of selecting the sub surrounding device 3000 according to a context of the host device 1000, and controlling the sub surrounding device 3000 by the main surrounding device 2000, according to an exemplary embodiment.

In operation S500, the host device 1000 scans one or more surrounding devices. The host device 1000 may scan the surrounding devices by using at least one of NFC, ZigBee communication, RFID communication, UWB communication, and Bluetooth communication. Then, the host device 1000 may receive ID values from the surrounding devices, and may obtain a plurality of pieces of surrounding device information about the surrounding devices from the server 4000 by using the ID values. The surrounding device information may include, but is not limited to, information about a function of each surrounding device, information about a communication method that is used by each surrounding device, connection information for connection with each surrounding device, application information about one or more applications installed in each surrounding device, application information about an application to control each surrounding device, and information about a control command of each surrounding device.

In operation S505, the host device 1000 determines a context of the host device 1000. The host device 1000 may check at least one of a type of content that is executed in the host device 1000, a type of a service that is provided by the host device 1000, a user of the host device 1000, an attribute of the host device 1000, and an environment of the host device 1000.

In operation S510, the host device 1000 provides the plurality of pieces of surrounding device information to the main surrounding device 2000. The host device 1000 may determine the main surrounding device 2000 from among the scanned surrounding devices, and may provide the plurality of pieces of surrounding device information about the scanned surrounding devices to the main surrounding device 2000. In this case, the host device 1000 may determine the main surrounding device 2000 from among the scanned surrounding devices, based on the context of the host device 1000.

However, the one or more exemplary embodiments are not limited thereto, and the main surrounding device 2000 may be already connected to the host device 1000. In this case, the host device 1000 may provide the plurality of pieces of surrounding device information about the scanned surrounding devices to the main surrounding device 2000 that is connected to the host device 1000.

In operation S515, the host device 1000 provides context information about the context of the host device 1000 to the main surrounding device 2000.

In operation S520, the server 4000 provides topology setting information to the main surrounding device 2000. The server 4000 may provide the topology setting information to the main surrounding device 2000, in response to a request by the host device 1000 or the main surrounding device 2000.

In operation S525, the main surrounding device 2000 defines a topology and determines the sub surrounding device 3000 to be included in the topology, based on the context of the host device 1000. Based on the context information of the host device 1000, the topology setting information, and the plurality of pieces of surrounding device information about the scanned surrounding devices, the main surrounding device 2000 may define the topology and may determine the sub surrounding device 3000 to be included in the topology.

In operation S530, the host device 1000 installs and executes an application to control the main surrounding device 2000. The host device 1000 may previously obtain application information about the application to control the main surrounding device 2000 from the main surrounding device 2000 or the server 4000, and may install the application to control the main surrounding device 2000 in the host device 1000. The application information may include an application file and link information for downloading the application file. If the application to control the main surrounding device 2000 is already installed in the host device 1000, the host device 1000 may execute the application to control the main surrounding device 2000 without a separate installation process.

In operation S535, the main surrounding device 2000 installs and executes an application to control the sub surrounding device 3000. The main surrounding device 2000 may previously obtain application information about the application to control the sub surrounding device 3000 from the host device 1000 or the server 4000, and may install the application to control the sub surrounding device 3000 in the main surrounding device 2000. In a case where the main surrounding device 2000 obtains the application information about the application to control the sub surrounding device 3000 from the host device 1000, the host device 1000 may previously obtain the application information about the application to control the sub surrounding device 3000 from the sub surrounding device 3000 or the server 4000.

If the application to control the sub surrounding device 3000 is already installed in the main surrounding device 2000, the main surrounding device 2000 may execute the application to control the sub surrounding device 3000 without a separate installation process.

In operation S540, the host device 1000 may connect with the main surrounding device 2000, and in operation S545, the main surrounding device 2000 may connect with the sub surrounding device 3000.

The host device 1000 may previously obtain connection information for connection with the main surrounding device 2000 from the main surrounding device 2000 or the server 4000, and may connect with the main surrounding device 2000 by using the connection information.

The host device 1000 may obtain connection information for connection with the sub surrounding device 3000 from the sub surrounding device 3000 or the server 4000, and may provide the connection information to the main surrounding device 2000. Then, the main surrounding device 2000 may connect with the sub surrounding device 3000 by using the connection information, but one or more exemplary embodiments are not limited thereto.

Figure 6:
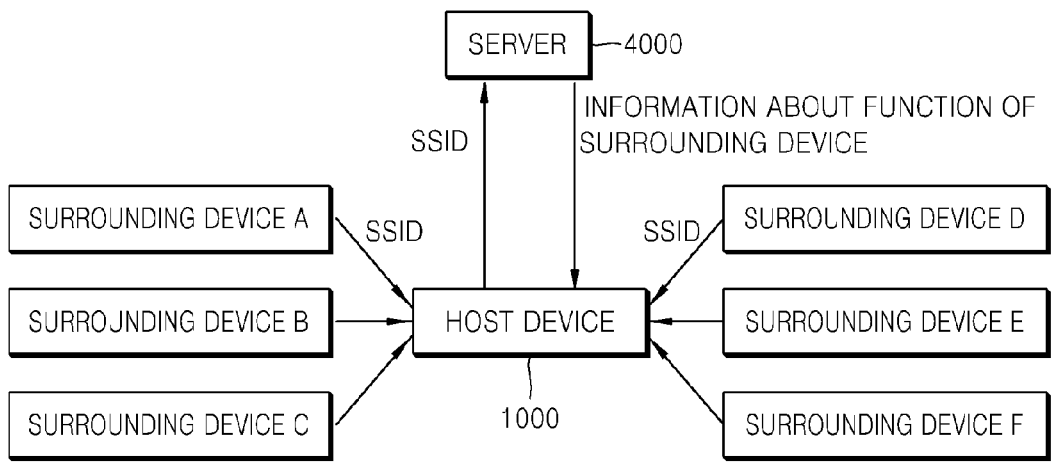
FIG. 6 illustrates an example in which the host device obtains a plurality of pieces of surrounding device information about surrounding devices from the surrounding devices and a server, according to an exemplary embodiment.

FIG. 6 illustrates an example in which the host device 1000 obtains a plurality of pieces of surrounding device information about surrounding devices A through F from the surrounding devices A through F and the server 4000, according to an exemplary embodiment.

Referring to FIG. 6, the host device 1000 may scan the surrounding devices A through F, and may receive ID values (e.g., SSIDs) from the surrounding devices A through F, respectively. Also, the host device 1000 may transmit the ID values to the server 4000 and then may request the server 4000 for the plurality of pieces of surrounding device information about the surrounding devices A through F. Also, the server 4000 may obtain the plurality of pieces of surrounding device information about the surrounding devices A through F from a DB (not shown) in the server 4000 or from an external server (not shown), based on the ID values of the surrounding devices A through F. Then, the server 4000 may transmit the plurality of pieces of obtained surrounding device information to the host device 1000.

The surrounding device information may include, but is not limited to, information about a function of each surrounding device, information about a communication method that is of use to each surrounding device, connection information for connection with each surrounding device, application information about one or more applications installed in each surrounding device, application information about an application to control each surrounding device, and information about a control command of each surrounding device.

The function of each surrounding device may vary according to topologies including the surrounding device and a type of other devices included in the topologies. For example, in a case where the surrounding device is a lighting fixture, when the lighting fixture is included in a topology A, the lighting fixture may perform a mood light function (by which the lighting fixture is constantly turned on), and when the lighting fixture is included in a topology B, the lighting fixture may perform a flicker function.

Figure 7:
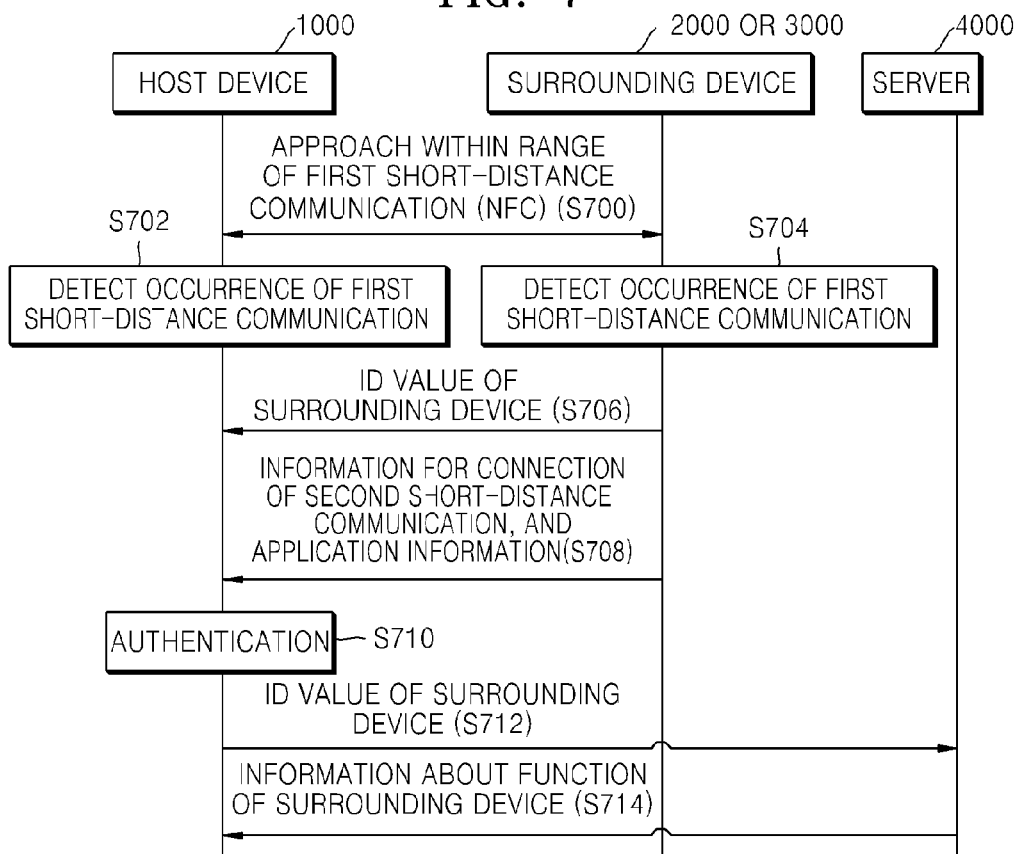
FIG. 7 is a flowchart of a method of obtaining surrounding device information about a surrounding device via Near Field Communication (NFC), which is performed by the host device, according to an exemplary embodiment.

FIG. 7 is a flowchart of a method of obtaining surrounding device information about a surrounding device via NFC, which is performed by the host device 1000, according to an exemplary embodiment.

In operation S700, when the host device 1000 and the surrounding device (here, the surrounding device indicates one of surrounding devices 2000 and 3000 and hereinafter, the surrounding device is referred as "the surrounding device 2000 or 3000") approach within a range of first short-distance communication, in operations S702 and S704, each of the host device 1000 and the surrounding device 2000 or 3000 detects occurrence of the first short-distance communication. The first short-distance communication may be NFC.

In operation S706, the surrounding device 2000 or 3000 transmits an ID value of the surrounding device 2000 or 3000 to the host device 1000 via the NFC. The ID value of the surrounding device 2000 or 3000 may include, but is not limited to, an SSID, a model name, a product serial number, and a user ID of the surrounding device 2000 or 3000.

In operation S708, the surrounding device 2000 or 3000 transmits information for connection of second short-distance communication and application information related to the surrounding device 2000 or 3000 to the host device 1000 via the NFC. The second short-distance communication may be different from the first short-distance communication and may include Bluetooth communication, Wi-Fi communication, or the like. Also, one of the surrounding devices 2000 and 3000 may be connected to at least one of the host device 1000 and the other one of the surrounding devices 2000 and 3000 via the second short-distance communication.

The application information related to the surrounding device 2000 or 3000 may include, but is not limited to, information about an application installed in the surrounding device 2000 or 3000 and information about another application to control the surrounding device 2000 or 3000.

In operation S710, the host device 1000 authenticates the surrounding device 2000 or 3000. The host device 1000 may receive previously-agreed authentication information from the surrounding device 2000 or 3000 and may authenticate the surrounding device 2000 or 3000 by using the authentication information.

In operation S712, the host device 1000 transmits the ID value of the surrounding device 2000 or 3000 to the server 4000, and in operation S714, the server 4000 transmits information about a function of the surrounding device 2000 or 3000 to the host device 1000.

Figure 8:
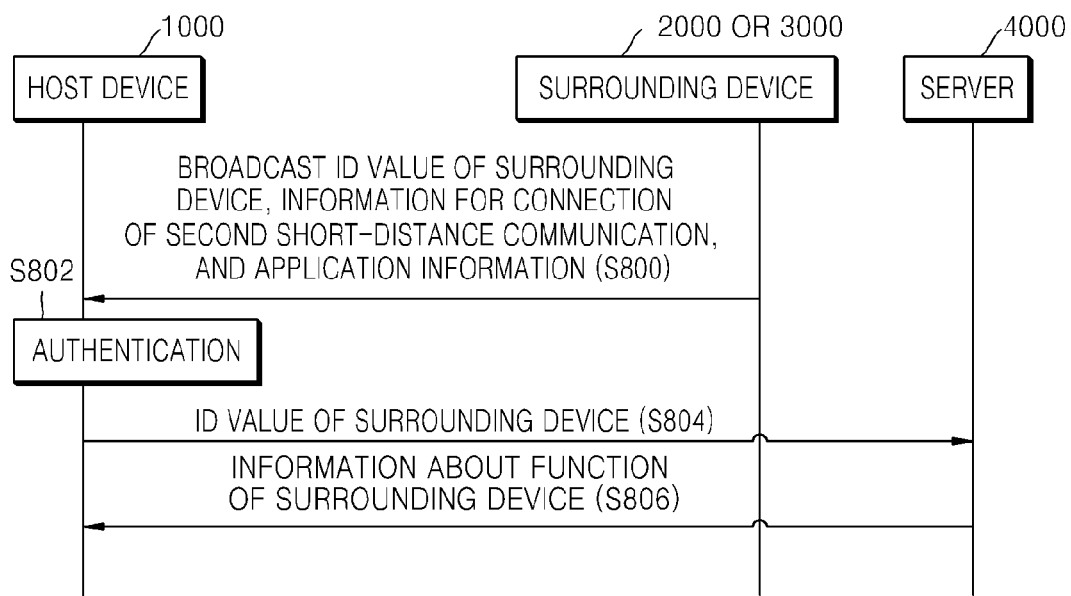
FIG. 8 is a flowchart of a method of obtaining surrounding device information about a surrounding device via Bluetooth Low Energy (BLE) communication, which is performed by the host device, according to an exemplary embodiment.

FIG. 8 is a flowchart of a method of obtaining surrounding device information about a surrounding device via BLE communication, which is performed by the host device 1000, according to an exemplary embodiment.

In operation S800, the surrounding device (here, the surrounding device indicates one of surrounding devices 2000 and 3000 and hereinafter, the surrounding device is referred to as "the surrounding device 2000 or 3000") broadcasts an ID value of the surrounding device 2000 or 3000, information for connection of second short-distance communication, and application information related to the surrounding device 2000 or 3000. The surrounding device 2000 or 3000 may broadcast the ID value of the surrounding device 2000 or 3000, the information for connection of second short-distance communication, and the application information related to the surrounding device 2000 or 3000 via the BLE communication. The second short-distance communication may be different from the BLE communication and may include NFC, Wi-Fi communication, or the like. Also, one of the surrounding devices 2000 and 3000 may be connected to at least one of the host device 1000 and the other one of the surrounding devices 2000 and 3000 via the second short-distance communication. The application information related to the surrounding device 2000 or 3000 may include, but is not limited to, information about an application installed in the surrounding device 2000 or 3000 and information about another application to control the surrounding device 2000 or 3000.

In operation S800, the host device 1000 may detect the BLE communication and then may receive information that is broadcast from the surrounding device 2000 or 3000.

In operation S802, when the host device 1000 receives the broadcast information, the host device 1000 authenticates the surrounding device 2000 or 3000. The host device 1000 may receive previously-agreed authentication information from the surrounding device 2000 or 3000 and may authenticate the surrounding device 2000 or 3000 by using the authentication information.

In operation S804, the host device 1000 transmits the ID value of the surrounding device 2000 or 3000 to the server 4000, and in operation S806, the server 4000 transmits information about a function of the surrounding device 2000 or 3000 to the host device 1000.

Figure 9:
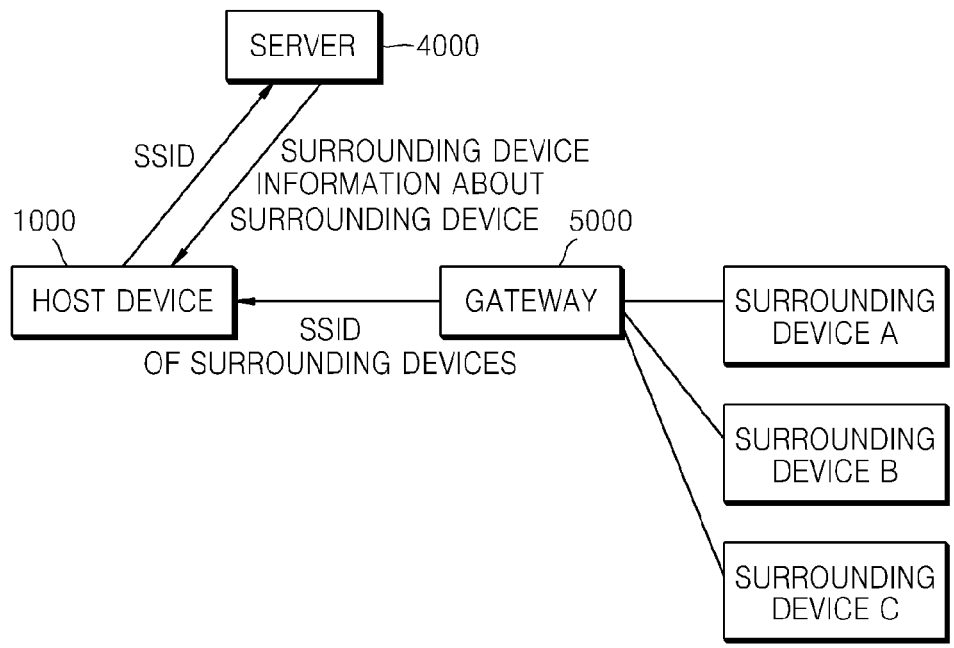
FIG. 9 illustrates an example in which the host device receives a plurality of pieces of surrounding device information about surrounding devices from a gateway and the server, according to an exemplary embodiment.

FIG. 9 illustrates an example in which the host device 1000 receives a plurality of pieces of surrounding device information about surrounding devices A through C from a gateway 5000 and the server 4000, according to an exemplary embodiment.

Referring to FIG. 9, the host device 1000 may connect with the gateway 5000, and the gateway 5000 may connect with the surrounding devices A through C. The host device 1000 may receive ID values (e.g., SSIDs) of the surrounding devices A through C from the gateway 5000. The gateway 5000 may be a home gateway in a home network, but a type of the gateway 5000 is not limited thereto. The gateway 5000 may be one of various surrounding devices around the host device 1000.

The host device 1000 may transmit the ID values to the server 4000 and then may request the server 4000 for the plurality of pieces of surrounding device information about the surrounding devices A through C. The server 4000 may obtain the plurality of pieces of surrounding device information about the surrounding devices A through C from a DB (not shown) in the server 4000 or from an external server (not shown), based on the ID values of the surrounding devices A through C. Then, the server 4000 may transmit the plurality of pieces of obtained surrounding device information to the host device 1000.

FIG. 10 illustrates examples in which the host device 1000 and surrounding devices configure topologies according to types of content executed by the host device 1000, according to an exemplary embodiment.

Figure 10A:
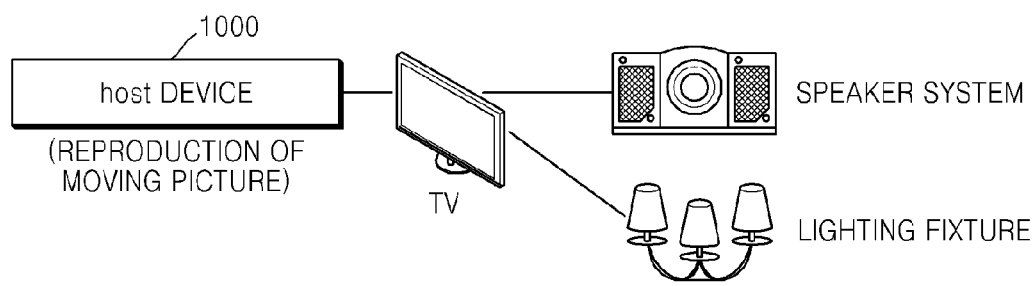
FIGS. 10A and 10B illustrate examples in which the host device and surrounding devices configure topologies according to the types of content executed by the host device, according to an exemplary embodiment.

Referring to FIG. 10A, when the host device 1000 reproduces a moving picture, the main surrounding device 2000 and the sub surrounding device 3000 may be determined based on resolution, a stored position, etc., of the moving picture that is reproduced by the host device 1000.

Also, as illustrated in FIG. 10A, when the moving picture is reproduced in the host device 1000, the host device 1000 may connect with a TV as the main surrounding device 2000, and the TV may connect with a speaker system and a lighting fixture as the sub surrounding device 3000. Also, the host device 1000 may stream the moving picture to the TV, and the TV may provide audio data of the moving picture to the speaker system.

At least one of the host device 1000 and the TV may install and execute an application to control at least one of the speaker system and the lighting fixture. Also, at least one of the host device 1000 and the TV may turn on a power of the lighting fixture and may adjust light intensity of the lighting fixture. Also, at least one of the host device 1000 and the TV may turn on a power of the speaker system and may adjust a volume of the speaker system.

Figure 10B:
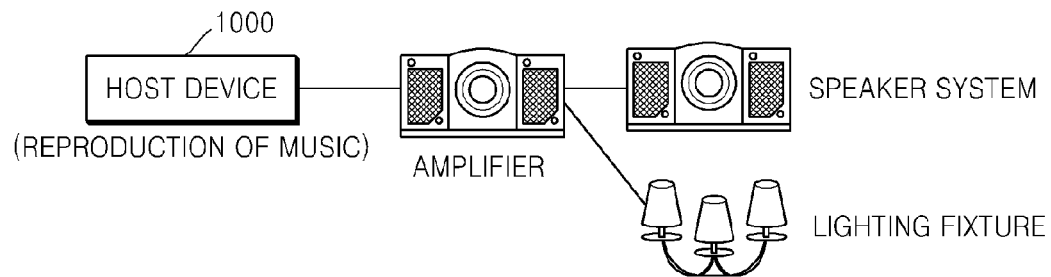

Referring to FIG. 10B, when a music file is reproduced in the host device 1000, the main surrounding device 2000 and the sub surrounding device 3000 may be determined based on a bit rate, a sampling frequency, and a stored position of the music file reproduced in the host device 1000.

Also, as illustrated in FIG. 10B, when music is reproduced in the host device 1000, the host device 1000 may connect with an amplifier as the main surrounding device 2000, and the amplifier may connect with a telephone, a speaker system, and a lighting fixture as the sub surrounding device 3000. In this case, the telephone connected to the host device 1000 may be a surrounding device that obstructs music listening of a user. The host device 1000 may provide acoustic data of the music to the amplifier, and then the amplifier may process the acoustic data and may provide the processed acoustic data to the speaker system. At least one of the host device 1000 and the amplifier may install and execute an application to control at least one of the speaker system, the telephone, and the lighting fixture. Also, at least one of the host device 1000 and the amplifier may turn on a power of the lighting fixture and may adjust light intensity of the lighting fixture. Also, at least one of the host device 1000 and the amplifier may turn on a power of the speaker system and may adjust a volume of the speaker system. Also, at least one of the host device 1000 and the amplifier may lower a sound level of a ringtone of the telephone.

FIG. 11 illustrates examples in which the host device 1000 and surrounding devices configure topologies according to types of a service executed by the host device 1000, according to an exemplary embodiment.

Figure 11A:
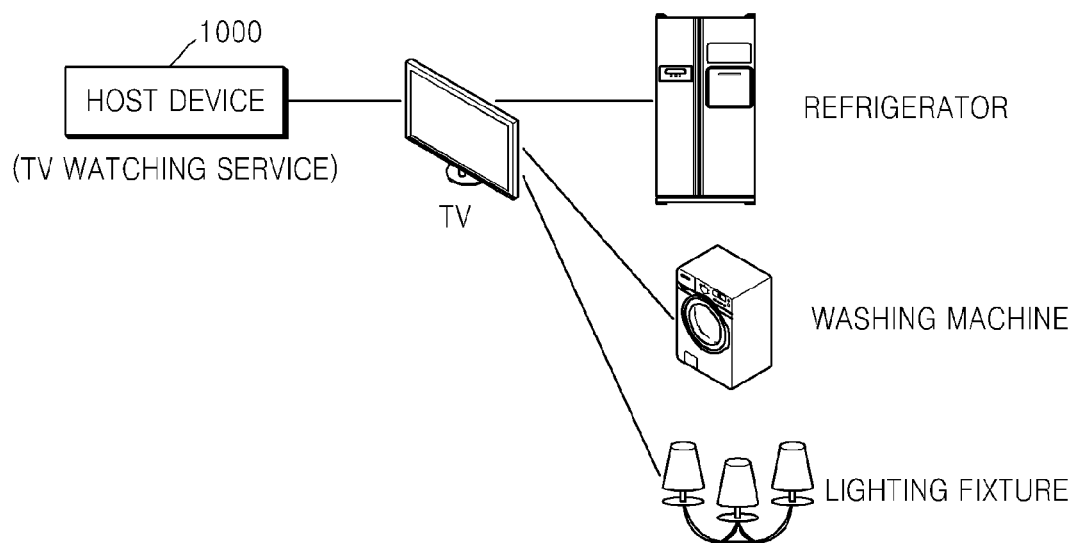
FIGS. 11A and 11B illustrate examples in which the host device and surrounding devices configure topologies according to types of a service executed by the host device, according to an exemplary embodiment.

Referring to FIG. 11A, when the host device 1000 provides a TV watching service, the host device 1000 may connect with a TV as the main surrounding device 2000, and the TV may connect with surrounding devices as the sub surrounding device 3000 that may obstruct TV watching of a user. For example, the TV may connect with a refrigerator, a washing machine, and a lighting fixture as the sub surrounding device 3000. In this case, a list of the surrounding devices that may obstruct TV watching may be displayed on a TV screen, one of the surrounding devices which is selected based on a user input may be connected to the TV and may be controlled by the TV or the host device 1000. In this case, at least one of the host device 1000 and the TV may install and execute an application to control the surrounding device that is selected based on the user input.

The host device 1000 may stream a currently-produced moving picture to the TV, and the TV may display the moving picture. Also, the TV may generate a user interface (UI) so as to monitor and to control statuses of the refrigerator, the washing machine, and the lighting fixture, and may display the UI on the TV screen. Also, the TV may turn off a power of the refrigerator or the washing machine or may adjust light intensity of the lighting fixture, in response to a command from the host device 1000.

Figure 11B:
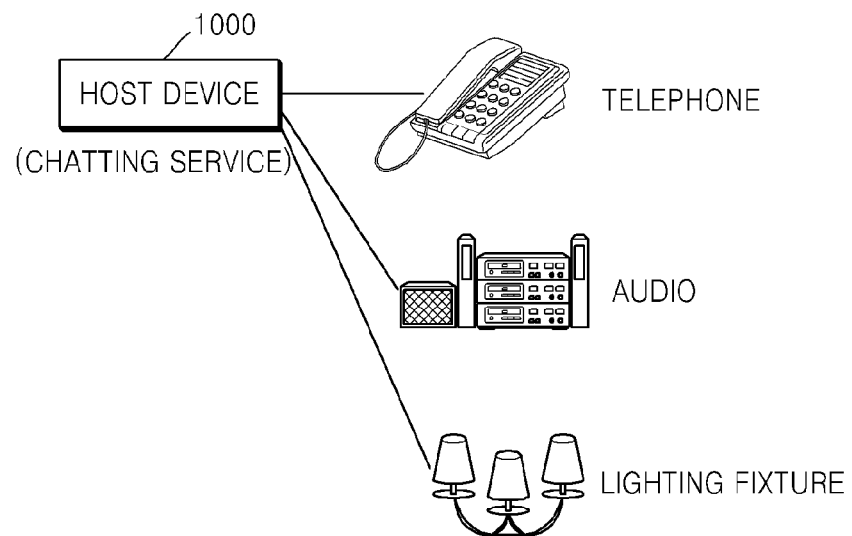

Referring to FIG. 11B, when the host device 1000 provides a chatting service, the host device 1000 may connect with an audio system and a lighting fixture as the main surrounding device 2000. Also, the host device 1000 may interpret a text that is input by a user via the chatting service. The host device 1000 may recognize an emotional state of the user from the user-input text by using various natural language interpreting methods. Also, the host device 1000 may select music to be provided to the audio system according to the emotional state of the user, and may provide the selected music to the audio system. The host device 1000 may also adjust light intensity of the lighting fixture according to the emotional state of the user. For example, when the host device 1000 determines that the user is in a good mood, by referring to a message that is input by the user via the chatting service, the host device 1000 may provide dance music to the audio system and may increase the light intensity of the lighting fixture.

FIG. 12 illustrates examples in which the host device 1000 and surrounding devices configure topologies according to users, according to an exemplary embodiment.

Figure 12A:
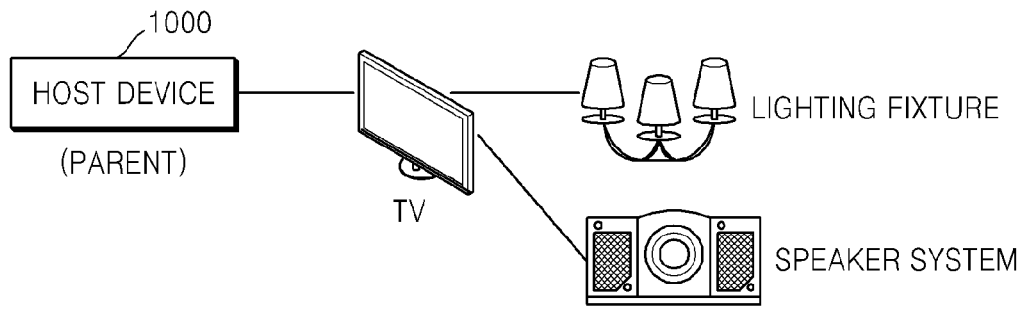
FIGS. 12A and 12B illustrate examples in which the host device and surrounding devices configure topologies according to users, according to an exemplary embodiment.

Referring to FIG. 12A, when a user of the host device 1000 is a parent, and the host device 1000 reproduces a moving picture, the host device 1000 may connect with a TV as the main surrounding device 2000, and the TV may connect with a speaker system and a lighting fixture as the sub surrounding device 3000. In this case, the TV may reproduce all types of a moving picture without restriction. Also, the host device 1000 may stream the moving picture to the TV, and the TV may provide audio data of the moving picture to the speaker system. Also, at least one of the host device 1000 and the TV may turn on a power of the lighting fixture and may adjust light intensity of the lighting fixture. Also, at least one of the host device 1000 and the TV may turn on a power of the speaker system and may adjust a volume of the speaker system.

Figure 12B:
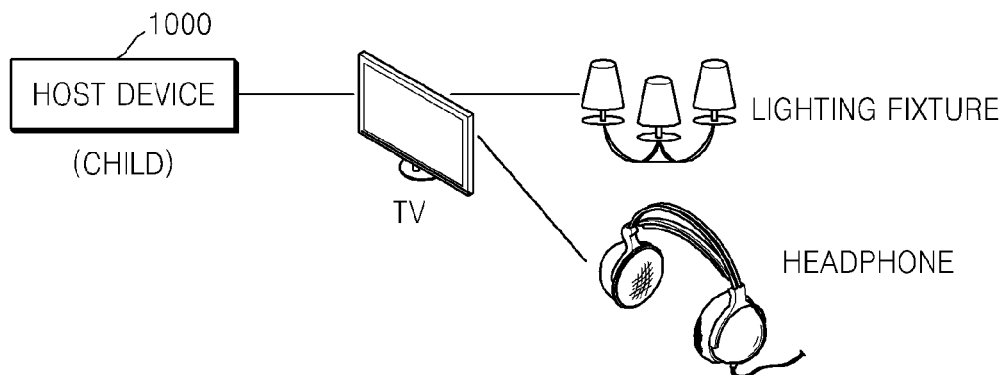

Referring to FIG. 12B, when a user of the host device 1000 is a child, and the host device 1000 reproduces a moving picture, the host device 1000 may connect with a TV as the main surrounding device 2000, and the TV may connect with a headphone and a lighting fixture as the sub surrounding device 3000. In this case, types of the moving picture which are reproducible in the TV may be restricted. The host device 1000 may stream the moving picture to the TV, and the TV may provide audio data of the moving picture to the headphone. At least one of the host device 1000 and the TV may turn on a power of the lighting fixture and may adjust light intensity of the lighting fixture. Also, at least one of the host device 1000 and the TV may turn on a power of the speaker system and may adjust a volume of the headphone. The headphone may be a wireless headphone and may adjust a volume of the TV based on a remaining battery capacity of the headphone. In this case, the headphone may previously obtain an application to control the TV from at least one of the host device 1000, the TV, and the server 4000, and may install the application.

FIG. 13 illustrates examples in which the host device 1000 and surrounding devices configure topologies according to attributes of the main surrounding device 2000 connected to the host device 1000, according to an exemplary embodiment.

Figure 13A:
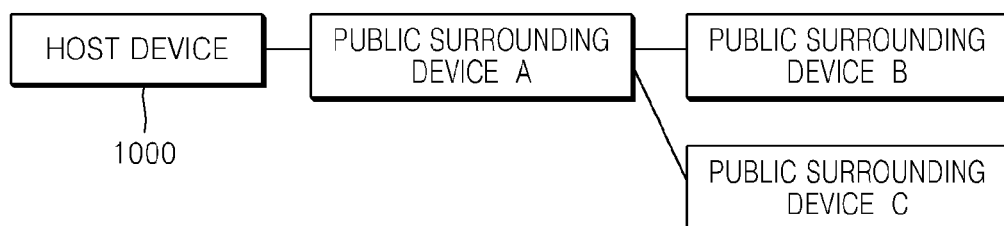
FIGS. 13A and 13B illustrate examples in which the host device and surrounding devices configure topologies according to attributes of the main surrounding device connected to the host device, according to an exemplary embodiment.

Referring to FIG. 13A, when the host device 1000 connects with a public surrounding device A as the main surrounding device 2000, the public surrounding device A may connect with a public surrounding device B and a public surrounding device C as the sub surrounding device 3000.

Figure 13B:
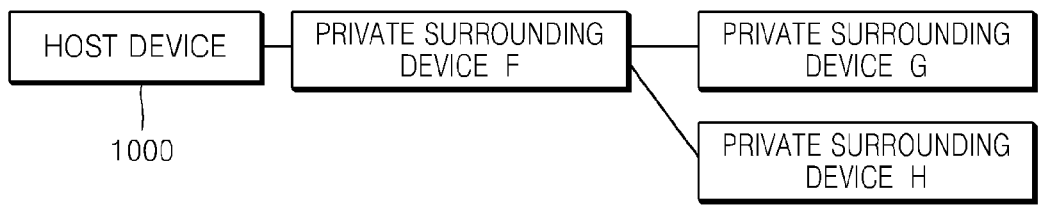

Referring to FIG. 13B, when the host device 1000 connects with a private surrounding device F as the main surrounding device 2000, the public surrounding device F may connect with a public surrounding device G and a public surrounding device H as the sub surrounding device 3000.

Here, the public surrounding device may be used by a plurality of users, e.g., may be a device that may be used by all family members or by anybody in a public place. Also, the private surrounding device may be used by at least one specific user, e.g., the private surrounding device may be used by a specific member of a family. For example, in a house, each of a TV, a refrigerator, a washing machine, and a lighting fixture in a living room may be the public surrounding device that may be controlled by all family members, and each of a lighting fixture in a private room, a PC, and a mobile phone may be the private surrounding device that may be controlled by a specific one of the family members. Also, for example, in an office, a printer may be the public surrounding device, and the PC may be the private surrounding device.

FIG. 14 illustrates flowcharts of methods of connecting the host device 1000, the main surrounding device 2000 and the sub surrounding device 3000, according to exemplary embodiments.

Figure 14A:
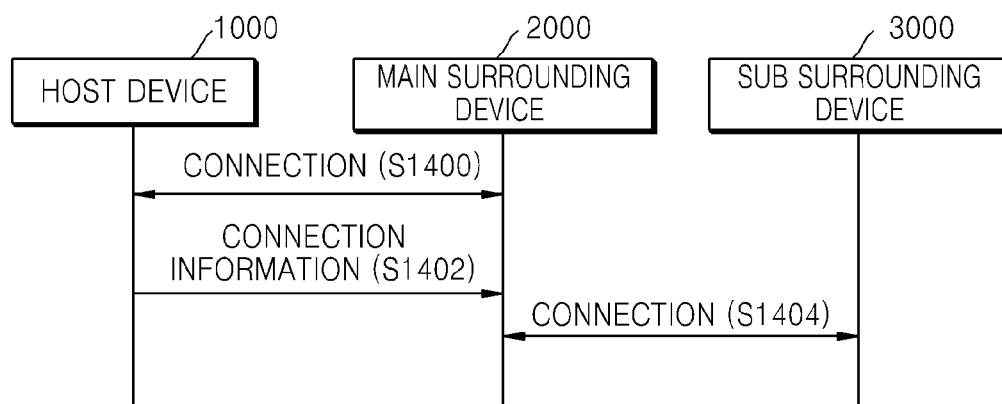
FIGS. 14A and 14B illustrate flowcharts of methods of connecting the host device, the main surrounding device and the sub surrounding device, according to exemplary embodiments.

Referring to FIG. 14A, the host device 1000 may connect with the main surrounding device 2000 (operation S1400), and may provide connection information of the sub surrounding device 3000 to the main surrounding device 2000 (operation S1402). Also, the main surrounding device 2000 may connect with the sub surrounding device 3000 by using the connection information (operation S1404).

Figure 14B:
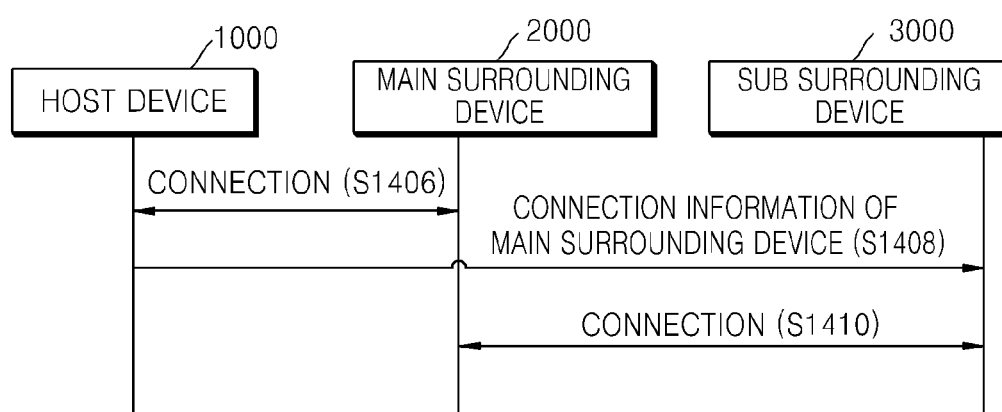

Alternatively, referring to FIG. 14(b), the host device 1000 may connect with the main surrounding device 2000 (operation S1406), and may provide connection information of the main surrounding device 2000 to the sub surrounding device 3000 (operation S1408). Also, the main surrounding device 2000 may connect with the sub surrounding device 3000 by using the connection information (operation S1410).

Figure 15:
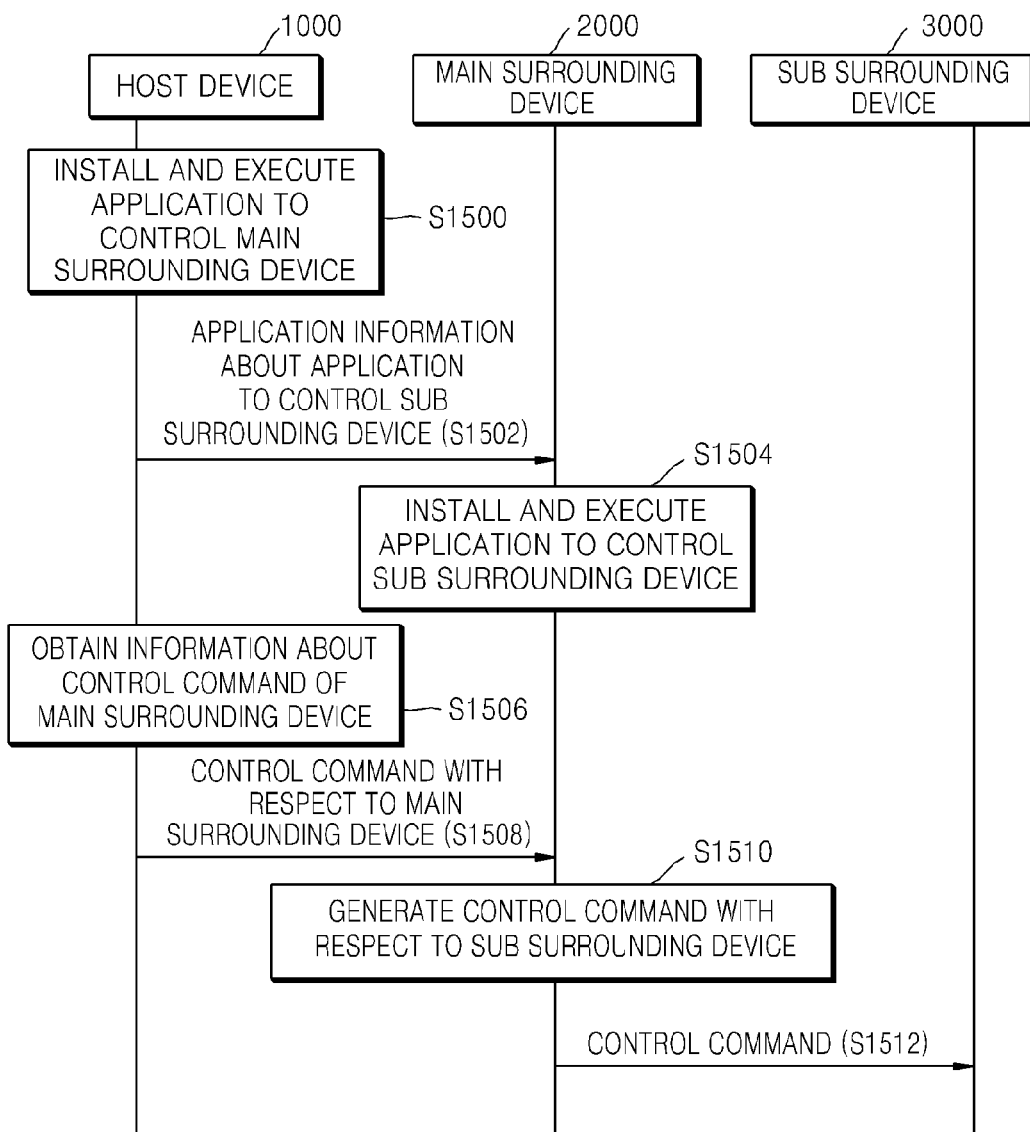
FIGS. 15 through 17 illustrate flowcharts of methods of controlling the main surrounding device and the sub surrounding device, which are performed by the host device, according to exemplary embodiments.
Figure 16:
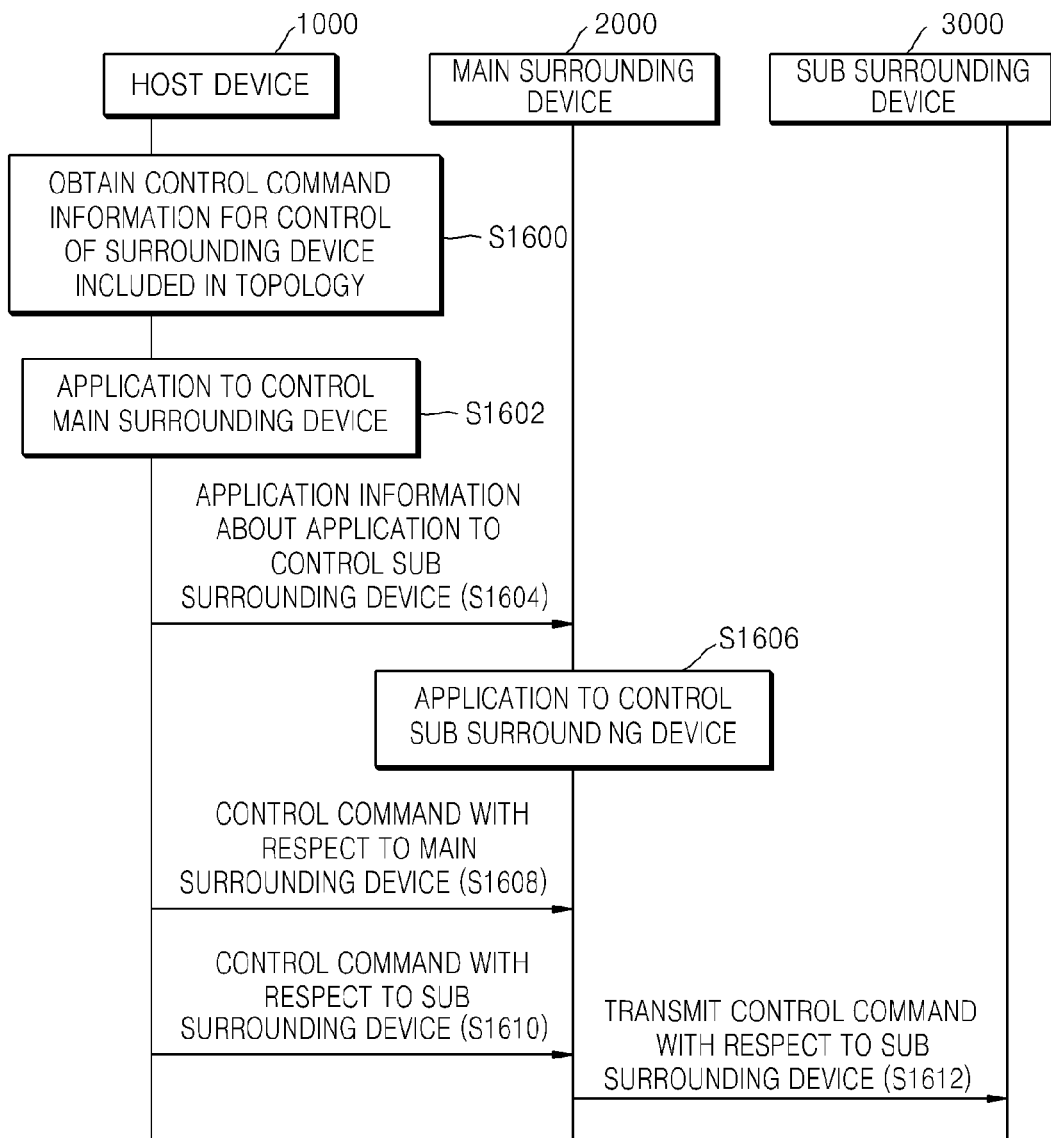
Figure 17:
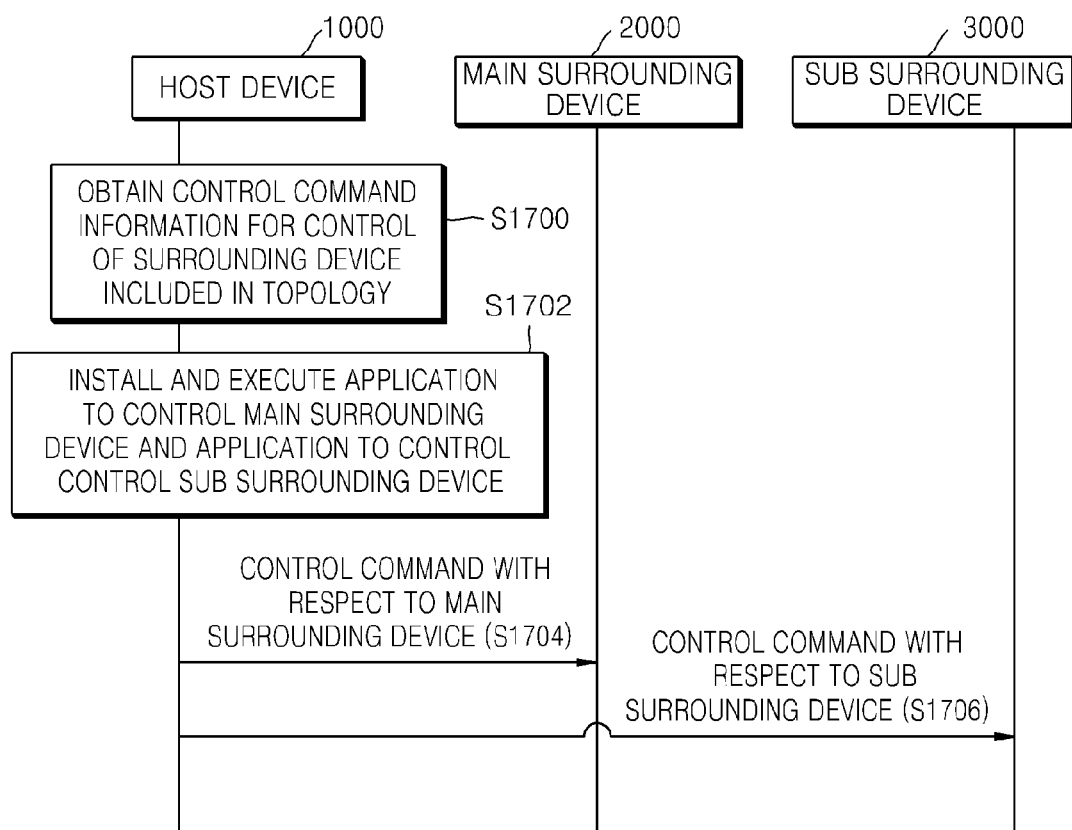

FIGS. 15 through 17 illustrate flowcharts of methods of controlling the main surrounding device 2000 and the sub surrounding device 3000, which are performed by the host device 1000, according to exemplary embodiments.

In the flowchart of FIG. 15, the host device 1000 may control the main surrounding device 2000, and the main surrounding device 2000 may generate a control command and then may provide the control command to the sub surrounding device 3000.

In operation S1500, the host device 1000 installs and executes an application to control the main surrounding device 2000. The host device 1000 may receive application information about the application to control the main surrounding device 2000 from the server 4000, by using the ID value of the main surrounding device 2000 which is received from the main surrounding device 2000 in the operation of scanning the one or more surrounding devices (operation S300). The application information may include at least one of an application file and link information for downloading the application file. However, one or more exemplary embodiments are not limited thereto, and the host device 1000 may receive the application information about the application to control the main surrounding device 2000 from the main surrounding device 2000 in the operation of scanning the one or more surrounding devices (operation S300).

In operation S1502, the host device 1000 provides application information about an application to control the sub surrounding device 3000 to the main surrounding device 2000. The host device 1000 may receive the application information about the application to control the sub surrounding device 3000 from the server 4000, by using the ID value of the sub surrounding device 3000 which is received from the sub surrounding device 3000 in the operation of scanning the one or more surrounding devices (operation S300). The application information may include at least one of an application file and link information for downloading the application file. However, one or more exemplary embodiments are not limited thereto, and the host device 1000 may receive the application information about the application to control the sub surrounding device 3000 from the sub surrounding device 3000 in the operation of scanning the one or more surrounding devices (operation S300).

In operation S1504, the main surrounding device 2000 installs and executes the application to control the sub surrounding device 3000. When the main surrounding device 2000 receives the application file so as to control the sub surrounding device 3000 from the host device 1000, the main surrounding device 2000 may install the application file and may execute the application. Also, when the main surrounding device 2000 receives the link information for downloading the application file so as to control the sub surrounding device 3000 from the host device 1000, the main surrounding device 2000 may download the application file by using the link information and then may install the application file and may execute the application.

In operation S1506, the host device 1000 obtains information about a control command of the main surrounding device 2000. The host device 1000 may receive the information about the control command of the main surrounding device 2000 from the server 4000 or the main surrounding device 2000. Also, the control command of the main surrounding device 2000 may be included in the application to control the main surrounding device 2000.

In operation S1508, the host device 1000 transmits a control command to the main surrounding device 2000 so as to control the main surrounding device 2000. The host device 1000 may transmit the control command to the main surrounding device 2000 by using the application to control the main surrounding device 2000. The main surrounding device 2000 may be controlled in response to the control command transmitted from the host device 1000.

In operation S1510, the main surrounding device 2000 generates a control command so as to control the sub surrounding device 3000. The main surrounding device 2000 may generate the control command so as to control the sub surrounding device 3000, based on the control command transmitted from the host device 1000. Also, the main surrounding device 2000 may generate the control command so as to control the sub surrounding device 3000, by using the application to control the sub surrounding device 3000.

In operation S1512, the main surrounding device 2000 transmits the control command to the sub surrounding device 3000. The main surrounding device 2000 may transmit the control command to the sub surrounding device 3000, by using the application to control the sub surrounding device 3000.

In the flowchart of FIG. 16, the host device 1000 may control the main surrounding device 2000, and may provide a control command with respect to the sub surrounding device 3000 to the sub surrounding device 3000 via the main surrounding device 2000.

In operation S1600, the host device 1000 obtains control command information for control of at least one surrounding device included in a topology. The host device 1000 may receive the control command information for control of at least one surrounding device from the server 4000 or the at least one surrounding device. The control command information for control of at least one surrounding device may be included in an application to be described below.

In operation S1602, the host device 1000 installs and executes an application to control the main surrounding device 2000. The host device 1000 may receive application information about the application to control the main surrounding device 2000 from the server 4000, by using the ID value of the main surrounding device 2000 which is received from the main surrounding device 2000 in the operation of scanning the one or more surrounding devices (operation S300). The application information may include at least one of an application file and link information for downloading the application file. However, one or more exemplary embodiments are not limited thereto, and the host device 1000 may receive the application information about the application to control the main surrounding device 2000 from the main surrounding device 2000 in the operation of scanning the one or more surrounding devices (operation S300).

In operation S1604, the host device 1000 provides application information about an application to control the sub surrounding device 3000 to the main surrounding device 2000. The host device 1000 may receive the application information about the application to control the sub surrounding device 3000 from the server 4000, by using the ID value of the sub surrounding device 3000 which is received from the sub surrounding device 3000 in the operation of scanning the one or more surrounding devices (operation S300). The application information may include at least one of an application file and link information for downloading the application file. However, one or more exemplary embodiments are not limited thereto, and the host device 1000 may receive the application information about the application to control the sub surrounding device 3000 from the sub surrounding device 3000 in the operation of scanning the one or more surrounding devices (operation S300).

In operation S1606, the main surrounding device 2000 installs and executes the application to control the sub surrounding device 3000. When the main surrounding device 2000 receives the application file so as to control the sub surrounding device 3000 from the host device 1000, the main surrounding device 2000 may install the application file and may execute the application. Also, when the main surrounding device 2000 receives the link information for downloading the application file so as to control the sub surrounding device 3000 from the host device 1000, the main surrounding device 2000 may download the application file by using the link information and then may install the application file and may execute the application.

In operation S1608, the host device 1000 transmits a control command to the main surrounding device 2000 so as to control the main surrounding device 2000. The host device 1000 may transmit the control command to the main surrounding device 2000 by using the application to control the main surrounding device 2000. The main surrounding device 2000 may be controlled in response to the control command transmitted from the host device 1000.

In operation S1610, the host device 1000 generates a control command so as to control the sub surrounding device 3000, and transmits the control command to the main surrounding device 2000. The host device 1000 may transmit the control command to the main surrounding device 2000 by using the application to control the main surrounding device 2000.

In operation S1612, the main surrounding device 2000 transmits the control command received from the host device 1000 to the sub surrounding device 3000. The main surrounding device 2000 may transmit the received control command to the sub surrounding device 3000, by using the application to control the sub surrounding device 3000. The sub surrounding device 3000 may be controlled in response to the control command from the main surrounding device 2000.

In the flowchart of FIG. 17, the host device 1000 may directly control the main surrounding device 2000 and the sub surrounding device 3000.

In operation S1700, the host device 1000 obtains control command information for control of at least one surrounding device included in a topology. The host device 1000 may receive the control command information for control of at least one surrounding device from the server 4000 or the at least one surrounding device. The control command information for control of at least one surrounding device may be included in an application to be described below.

In operation S1702, the host device 1000 installs and executes an application to control the main surrounding device 2000, and installs and executes an application to control the sub surrounding device 3000.

In operation S1704, the host device 1000 transmits a control command to the main surrounding device 2000 so as to control the main surrounding device 2000. The host device 1000 may transmit the control command to the main surrounding device 2000 by using the application to control the main surrounding device 2000. Also, the main surrounding device 2000 may be controlled in response to the control command received from the host device 1000.

In operation S1706, the host device 1000 transmits a control command to the sub surrounding device 3000 so as to control the sub surrounding device 3000. The host device 1000 may transmit the control command to the sub surrounding device 3000 by using the application to control the sub surrounding device 3000. Also, the sub surrounding device 3000 may be controlled in response to the control command received from the host device 1000.

Figure 18:
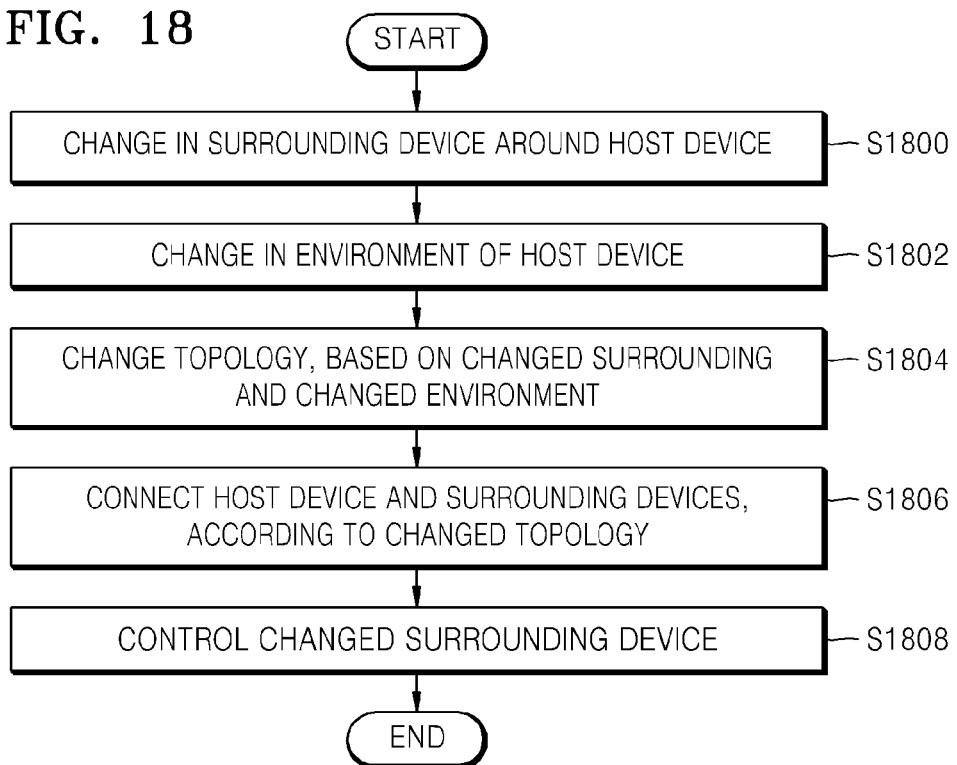
FIG. 18 is a flowchart of a method of changing a configured topology and controlling at least one surrounding device based on the changed topology.

FIG. 18 is a flowchart of a method of changing a configured topology and controlling at least one surrounding device based on the changed topology, which is performed by the host device 1000, according to an exemplary embodiment.

In operation S1800, at least one surrounding device around the host device 1000 is changed. That is, at least one of the main surrounding device 2000 and the sub surrounding device 3000 may be removed from a topology that includes the host device 1000, or a new surrounding device may be added to the topology including the host device 1000.

In operation S1802, an environment of the host device 1000 changes. For example, a position of the host device 1000, weather and/or temperature of a place where the host device 1000 is positioned may change, or motion of the host device 1000 may change. However, one or more exemplary embodiments are not limited thereto, and for example, when the host device 1000 may be moved from a house to the outside of the house, or when weather of the place including the host device 1000 may change from sunny weather to rainy weather, the environment of the host device 1000 may change.

In operation S1804, the host device 1000 changes the topology, based on the changed surrounding device and the changed environment. The host device 1000 may obtain topology setting information about topology configuration standards from the server 4000, and may change the topology based on the topology setting information, the changed surrounding device, and the changed environment.

However, one or more exemplary embodiments are not limited thereto, and when information about the changed surrounding device and the changed environment is provided to the server 4000, the server 4000 may change the topology. In this case, the host device 1000 may receive information about the changed topology, which is changed by the server 4000, from the server 4000.

In operation S1806, the host device 1000 connects with one or more surrounding devices, according to the changed topology. The host device 1000 may connect with the main surrounding device 2000 according to the changed topology, and the main surrounding device 2000 may connect with the sub surrounding device 3000 according to the changed topology.

In operation S1808, the host device 1000 controls the changed surrounding device. The host device 1000 may install and execute an application to control the main surrounding device 2000, and may control the main surrounding device 2000 by using the executed application.

The host device 1000 may also install and execute an application to control the sub surrounding device 3000, and may control the sub surrounding device 3000 by using the executed application.

The host device 1000 may provide application information about the application to control the sub surrounding device 3000 to the main surrounding device 2000. In this case, the main surrounding device 2000 may install and execute the application to control the sub surrounding device 3000, and may control the sub surrounding device 3000 by using the executed application, based on a control from the host device 1000.

Figure 19:
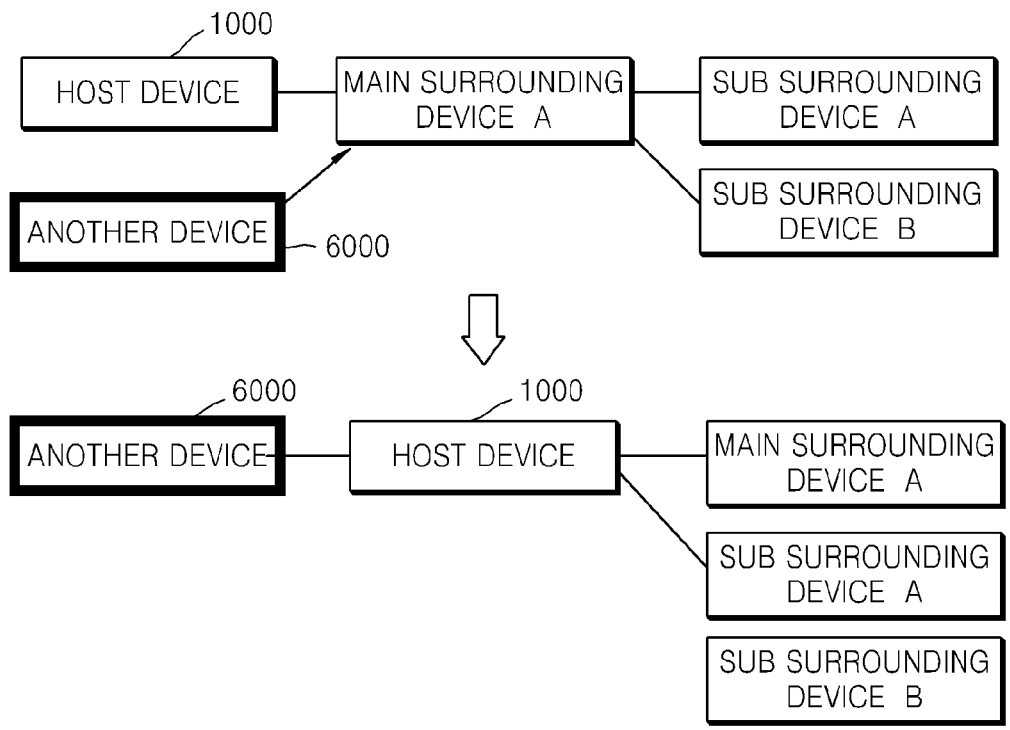
FIGS. 19 through 21 illustrate examples in which, when another device is added to a topology that includes the host device and surrounding devices, the topology is changed, according to exemplary embodiments.
Figure 20:
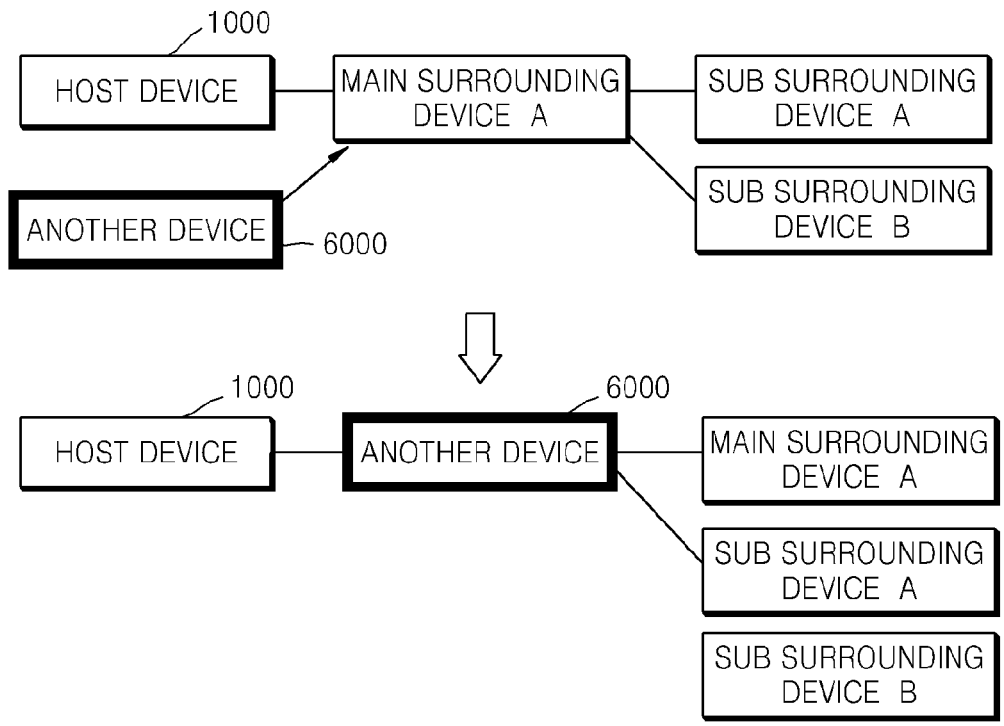
Figure 21:
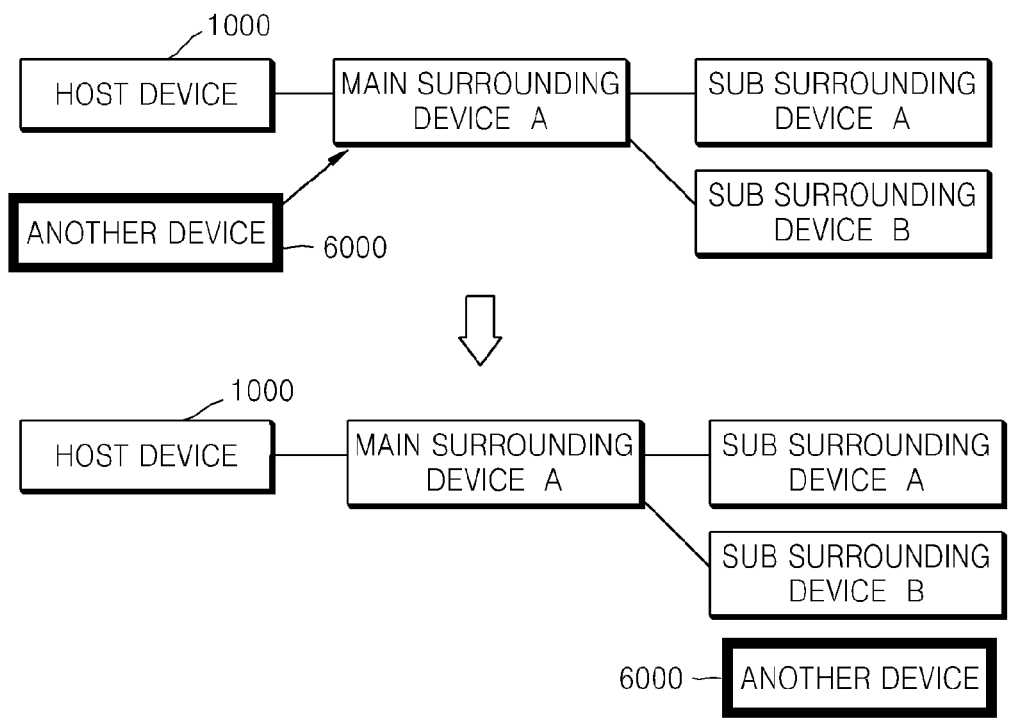

FIGS. 19 through 21 illustrate examples in which, when another device 6000 is added to a topology that includes the host device 1000 and surrounding devices, the topology is changed, according to exemplary embodiments.

Referring to FIG. 19, when the other device 6000 is added to the topology that includes the host device 1000 and the surrounding devices, the other device 6000 may operate as a host device, and the host device 1000 may operate as a main surrounding device.

Referring to FIG. 20, when the other device 6000 is added to the topology that includes the host device 1000 and the surrounding devices, the other device may operate as a host device, and the other device 6000 may also operate as a main surrounding device, and the main surrounding device A may operate as a sub surrounding device.

Referring to FIG. 21, when the other device 6000 is added to the topology that includes the host device 1000 and the surrounding devices, the other device 6000 may operate as a sub surrounding device.

Figure 22:
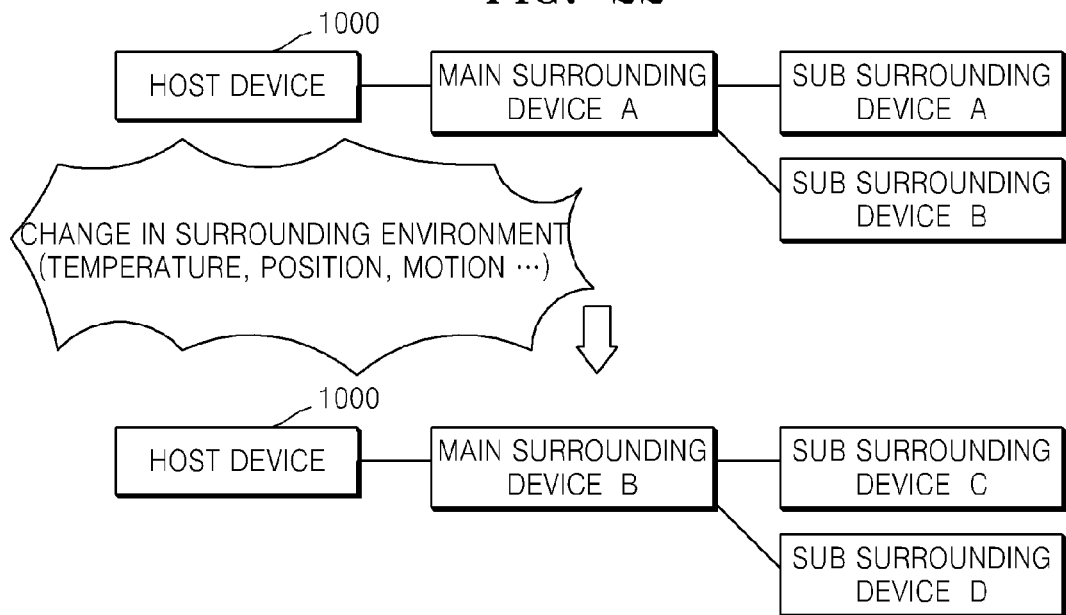
FIG. 22 illustrates an example in which, when an environment of the host device is changed, a topology including the host device is changed, according to an exemplary embodiment.

FIG. 22 illustrates an example in which, when an environment of the host device 1000 is changed, a topology including the host device 1000 is changed, according to an exemplary embodiment.

Referring to FIG. 22, the environment (e.g., a temperature, a position, or motion) of the host device 1000 is changed, a main surrounding device B may replace a main surrounding device A, and sub surrounding devices C and D may replace sub surrounding devices A and B. In the exemplary embodiment of FIG. 22, the main surrounding device A, and the sub surrounding devices A and B are all replaced, but one or more exemplary embodiments are not limited thereto. At least one of the main surrounding device A, the sub surrounding device A, and the sub surrounding device B may be replaced.

Figure 23:
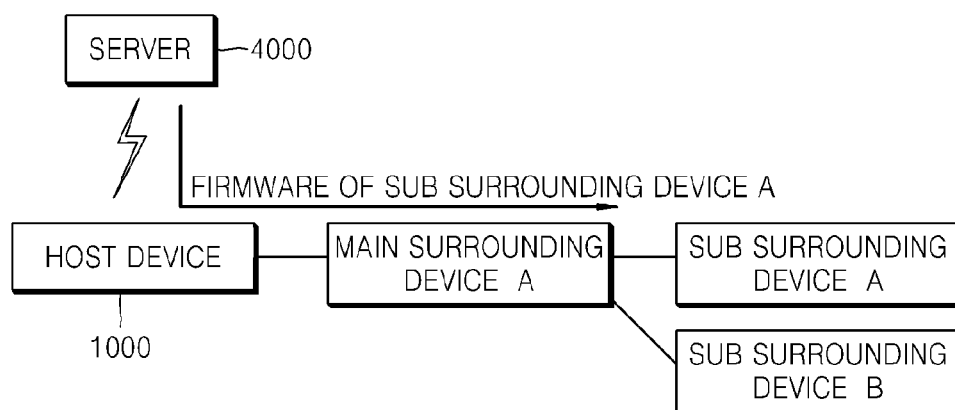
FIG. 23 illustrates a method of upgrading firmware of the sub surrounding device, which is performed by the host device, according to an exemplary embodiment.

FIG. 23 illustrates a method of upgrading firmware of the sub surrounding device 3000, which is performed by the host device 1000, according to an exemplary embodiment.

Referring to FIG. 23, the host device 1000 may connect with a main surrounding device A, and the main surrounding device A may connect with a sub surrounding device A and a sub surrounding device B. The host device 1000 may receive firmware to be installed in the sub surrounding device A from the server 4000, and may provide the firmware to the sub surrounding device A via the main surrounding device A.

A function of the sub surrounding device A included in a topology may be determined based on a connection relation between at least two of the host device 1000, the main surrounding device A, the sub surrounding device A, and the sub surrounding device B that are included in the topology. Also, the firmware with respect to the determined function may be provided from the server 4000 to the sub surrounding device A.

When a function of the sub surrounding device A is added, the host device 1000 may receive another firmware related to the added function from the server 4000, and may provide the other firmware to the sub surrounding device A via the main surrounding device A.

Figure 24:
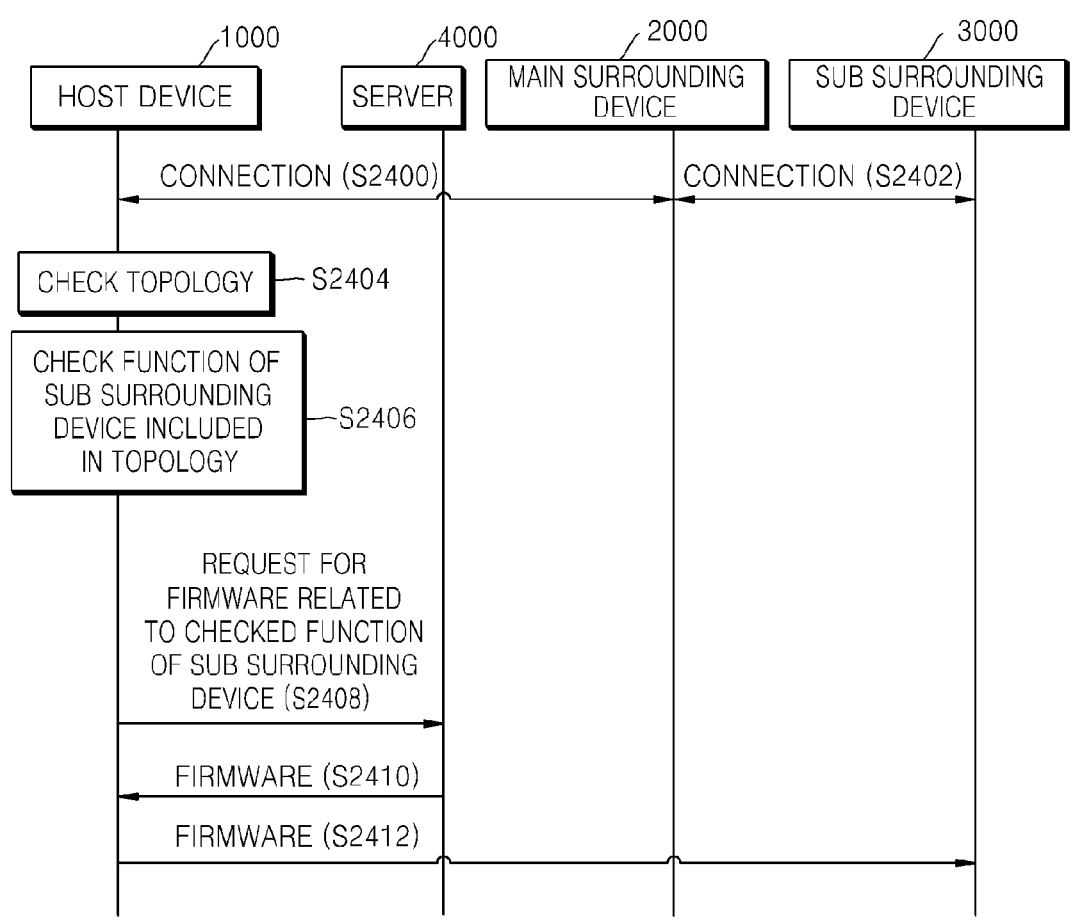
FIG. 24 is a flowchart of a method of updating firmware of the sub surrounding device based on connection relations among the host device, the main surrounding device, and the at least one sub surrounding device, which is performed by the host device, according to an exemplary embodiment.

FIG. 24 is a flowchart of a method of updating firmware of the sub surrounding device 3000 based on connection relations among the host device 1000, the main surrounding device 2000, and the sub surrounding device 3000, which is performed by the host device 1000, according to an exemplary embodiment.

In operation S2400, the host device 1000 connects with the main surrounding device 2000, and in operation S2402, the main surrounding device 2000 connects with the sub surrounding device 3000. Based on a context of the host device 1000, the host device 1000, the main surrounding device 2000, and the sub surrounding device 3000 may configure a topology.

In operation S2404, the host device 1000 checks the topology including the host device 1000, the main surrounding device 2000, and the sub surrounding device 3000. The host device 1000 may check the connection relations among the host device 1000, the main surrounding device 2000, and the sub surrounding device 3000 included in the topology. In particular, the host device 1000 may check to which device the sub surrounding device 3000 is connected.

In operation S2406, the host device 1000 checks a function of the sub surrounding device 3000 included in the topology. The function of the sub surrounding device 3000 may vary according to at least one of the topology including the sub surrounding device 3000, a type of another device included in the topology, a connection relation between the sub surrounding device 3000 and the other device, and the context of the host device 1000. For example, if a sub surrounding device is a lighting fixture, when the lighting fixture is included in a topology A, the lighting fixture may perform a mood light function (by which the lighting fixture is constantly turned on), and when the lighting fixture is included in a topology B, the lighting fixture may perform a flicker function. However, one or more exemplary embodiments are not limited thereto.

In operation S2408, the host device 1000 requests the server 4000 for firmware of the sub surrounding device 3000 which is related to the function of the sub surrounding device 3000. The host device 1000 may request the server 4000 for the firmware of the sub surrounding device 3000 by providing, to the server 4000, an ID value of the sub surrounding device 3000 and information about the function of the sub surrounding device 3000.

In operations S2404 through S2408, the host device 1000 checks the topology and the function of the sub surrounding device 3000, and requests the server 4000 for the firmware related to the checked function, but one or more exemplary embodiments are not limited thereto. In another exemplary embodiment, the server 4000 may receive the ID value of the sub surrounding device 3000 from the host device 1000, may check the topology including the sub surrounding device 3000 and the function of the sub surrounding device 3000, and may obtain the firmware related to the checked function of the sub surrounding device 3000 from the DB (not shown) in the server 4000 or from an external server (not shown).

In operation S2410, the server 4000 provides the firmware of the sub surrounding device 3000 to the host device 1000. The server 4000 may provide the firmware related to the checked function of the sub surrounding device 3000 to the host device 1000.

In operation S2412, the host device 1000 provides the firmware, which is received from the server 4000, to the sub surrounding device 3000 via the main surrounding device 2000.

In operations S2410 through S2412, the firmware of the sub surrounding device 3000 is provided from the server 4000 to the sub surrounding device 3000 via the host device 1000 and the main surrounding device 2000, but one or more exemplary embodiments are not limited thereto. In another exemplary embodiment, the server 4000 may provide the firmware to the main surrounding device 2000, and then the main surrounding device 2000 may provide the firmware to the sub surrounding device 3000. Also, the server 4000 may directly provide the firmware to the sub surrounding device 3000. In this case, the server 4000 may previously obtain connection information so as to provide the firmware to the main surrounding device 2000 and the sub surrounding device 3000.

Figure 25:
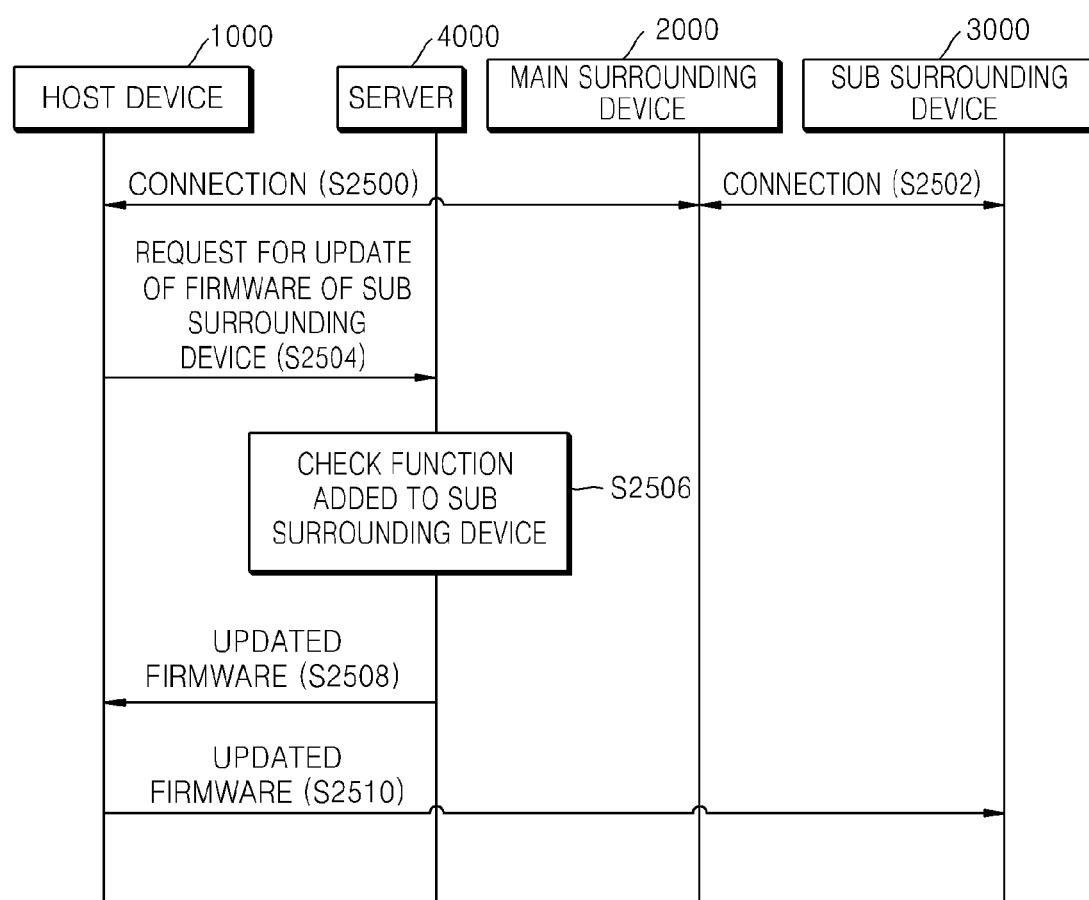
FIG. 25 is a flowchart of a method of updating firmware of the sub surrounding device when a function of the sub surrounding device is changed, which is performed by the host device, according to an exemplary embodiment.

FIG. 25 is a flowchart of a method of updating firmware of the sub surrounding device 3000 when a function of the sub surrounding device 3000 is changed, which is performed by the host device 1000, according to an exemplary embodiment.

In operation S2500, the host device 1000 connects with the main surrounding device 2000, and in operation S2502, the main surrounding device 2000 connects with the sub surrounding device 3000. Based on a context of the host device 1000, the host device 1000, the main surrounding device 2000, and the sub surrounding device 3000 may configure a topology.

In operation S2504, the host device 1000 requests the server 4000 for an update of the firmware of the sub surrounding device 3000. The host device 1000 may request the server 4000 for the update of the firmware of the sub surrounding device 3000 by providing, to the server 4000, an ID value of the sub surrounding device 3000 and information about the firmware installed in the sub surrounding device 3000. For example, the information about the firmware installed in the sub surrounding device 3000 may include, but is not limited to, an ID value and version information about the firmware that is installed in the sub surrounding device 3000.

In operation S2506, the server 4000 checks a function that is added to the sub surrounding device 3000. When the function of the sub surrounding device 3000 is added, a manufacturer of the sub surrounding device 3000 may generate firmware to perform the added function. Also, the server 4000 may check whether the firmware of the sub surrounding device 3000 is a latest version, based on the version information about the firmware of the sub surrounding device 3000 which is received from the host device 1000. By doing so, the server 4000 may also check whether the function of the sub surrounding device 3000 is added, but one or more exemplary embodiments are not limited thereto.

In operation S2508, the server 4000 provides updated firmware of the sub surrounding device 3000 to the host device 1000, and in operation S2510, the host device 1000 provides the updated firmware of the sub surrounding device 3000 to the sub surrounding device 3000 via the main surrounding device 2000.

In operations S2508 through S2510, the updated firmware of the sub surrounding device 3000 is provided from the server 4000 to the sub surrounding device 3000 via the host device 1000 and the main surrounding device 2000, but one or more exemplary embodiments are not limited thereto. In another exemplary embodiment, the server 4000 may provide the updated firmware to the main surrounding device 2000, and the main surrounding device 2000 may provide the updated firmware to the sub surrounding device 3000. Also, the server 4000 may directly provide the updated firmware to the sub surrounding device 3000. In this case, the server 4000 may previously obtain connection information so as to provide the updated firmware to the sub surrounding device 3000.

Figure 26:
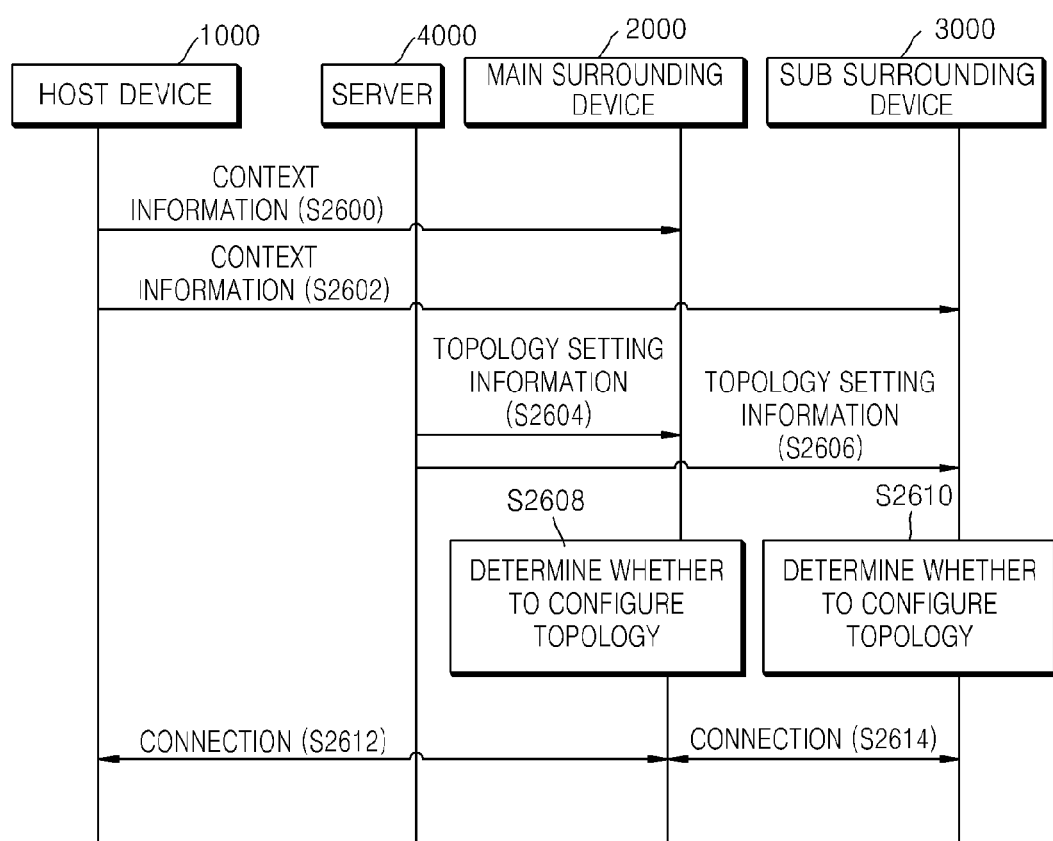
FIG. 26 is a flowchart of a method related to an example in which the main surrounding device and the sub surrounding device determine whether to configure a topology, and then the host device, the main surrounding device, and the sub surrounding device are connected to each other, according to an exemplary embodiment.

FIG. 26 is a flowchart of a method related to an example in which the main surrounding device 2000 and the sub surrounding device 3000 determine whether to configure a topology, and then the host device 1000, the main surrounding device 2000, and the sub surrounding device 3000 are connected to each other, according to an exemplary embodiment. In the flowchart of FIG. 26, the main surrounding device 2000 and the sub surrounding device 3000 may determine whether to configure the topology, based on a context of the host device 1000.

In operations S2600 and S2602, the host device 1000 provides context information about a context of the host device 1000 to the main surrounding device 2000 and the sub surrounding device 3000. The context of the host device 1000 may be related to at least one of an operation of the host device 1000, a user of the host device 1000, a surrounding environment of the host device 1000, and an attribute of the host device 1000. For example, the context of the host device 1000 may be determined according to a type of content that is executed in the host device 1000, a type of a service that is provided by the host device 1000, the user of the host device 1000, or the attribute of the host device 1000. Also, the context of the host device 1000 may be determined according to a position of the host device 1000, weather or temperature of a place where the host device 1000 is positioned, motion of the host device 1000, or the like. However, examples of the context of the host device 1000 are not limited thereto.

The host device 1000 may scan one or more surrounding devices around the host device 1000 and may transmit the context information about the context of the host device 1000 to the one or more scanned surrounding devices via NFC, but one or more exemplary embodiments are not limited thereto. For example, the host device 1000 may scan the one or more scanned surrounding devices or may broadcast the context information about the context of the host device 1000 to the one or more scanned surrounding devices via BLE communication.

In operation S2604, the server 4000 provides topology setting information about topology configuration standards to the main surrounding device 2000, and in operation S2606, the server 4000 provides the topology setting information about topology configuration standards to the sub surrounding device 3000. The main surrounding device 2000 and the sub surrounding device 3000 may previously obtain connection information for connection with the server 4000 from the host device 1000, and may request the server 4000 for the topology setting information, based on the connection information. In response to the request, the server 4000 may provide the topology setting information to the main surrounding device 2000 and the sub surrounding device 3000.

In operations S2604 through S2606, the server 4000 provides the topology setting information to the main surrounding device 2000 and the sub surrounding device 3000, but one or more exemplary embodiments are not limited thereto. In another exemplary embodiment, the host device 1000 may provide the topology setting information to the main surrounding device 2000 and the sub surrounding device 3000.

In operation S2608, the main surrounding device 2000 determines whether to configure a topology with respect to the host device 1000. The main surrounding device 2000 may determine whether to configure the topology with respect to the host device 1000, based on the context of the host device 1000 and the topology setting information. For example, when a moving picture is reproduced in the host device 1000, it may be determined to connect a TV that operates as the main surrounding device 2000 to the host device 1000, a speaker system, and a lighting fixture. Also, the main surrounding device 2000 may previously obtain surrounding device information about another surrounding device from at least one of the host device 1000, the gateway 5000, and the server 4000.

In operation S2610, the sub surrounding device 3000 determines whether to configure the topology with respect to the host device 1000. The sub surrounding device 3000 may determine whether to configure the topology with respect to the host device 1000, based on the context of the host device 1000 and the topology setting information. For example, when the moving picture is reproduced in the host device 1000, it may be determined to connect the speaker that operates as the sub surrounding device 3000 to the host device 1000. Also, the sub surrounding device 3000 may previously obtain the surrounding device information about the other surrounding device from at least one of the host device 1000, the gateway 5000, and the server 4000.

In operation S2612, the main surrounding device 2000 connects with the host device 1000, and in operation S2614, the main surrounding device 2000 and the sub surrounding device 3000 are connected to each other.

Figure 27:
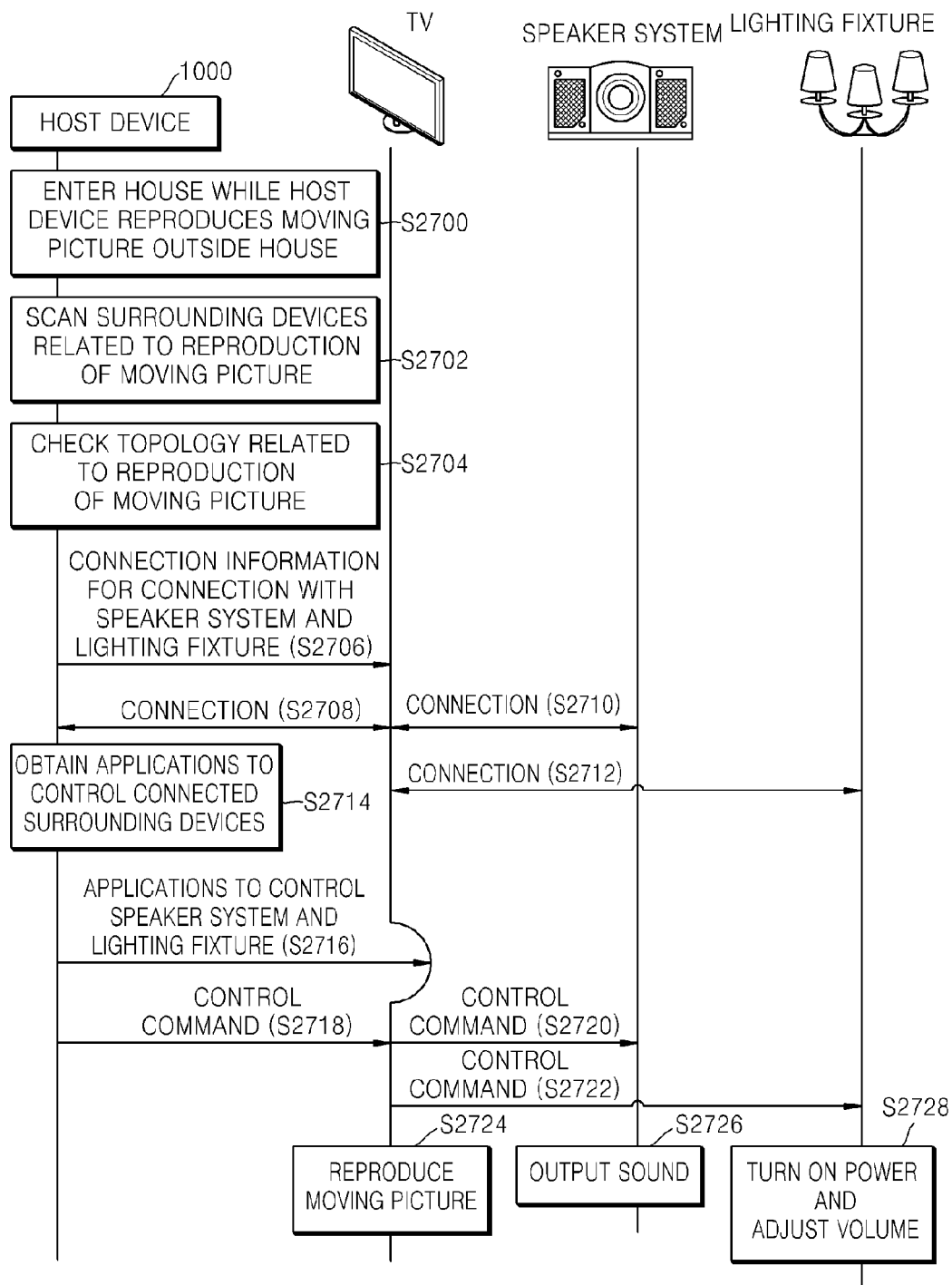
FIG. 27 illustrates an example in which surrounding devices are connected to and controlled by the host device according to a topology while a moving picture is being reproduced in the host device, according to an exemplary embodiment.

FIG. 27 illustrates an example in which surrounding devices are connected to and controlled by the host device 1000 according to a topology while a moving picture is being reproduced in the host device 1000, according to an exemplary embodiment.

In operation S2700, the host device 1000 reproduces the moving picture outside a house and then the host device 1000 enters the house.

In operation S2702, the host device 1000 scans surrounding devices related to reproduction of the moving picture. The host device 1000 may scan a TV, a speaker system, and a lighting fixture in the house as the surrounding devices related to reproduction of the moving picture. The host device 1000 may scan various surrounding devices in the house and then may select the TV, the speaker system, and the lighting fixture as the surrounding devices related to reproduction of the moving picture from among the various scanned surrounding devices, but one or more exemplary embodiments are not limited thereto.

In operation S2704, the host device 1000 checks a topology related to reproduction of the moving picture. The host device 1000 may check topology configuration standards with respect to the topology related to reproduction of the moving picture, may connect the host device 1000 with the TV, and then may connect the TV with the speaker system and the lighting fixture.

In operations S2702 and S2704, the host device 1000 scans the surrounding devices and then determines connection relations among the surrounding devices, but one or more exemplary embodiments are not limited thereto. In another exemplary embodiment, the host device 1000 may check the topology configuration standards with respect to the topology related to reproduction of the moving picture, and then may scan the TV, the speaker system, and the lighting fixture in the house based on the checked topology configuration standards.

Also, the host device 1000 may scan the various surrounding devices in the house and may provide a plurality of pieces of surrounding device information about the scanned surrounding devices and information about a context (reproduction of the moving picture) of the host device 1000 to the server 4000, and then the server 4000 may determine to include the TV, the speaker system, and the lighting fixture in the topology. In this case, the host device 1000 may receive ID values of the TV, the speaker system, and the lighting fixture and information about connection relations therebetween from the server 4000.

In operation S2706, the host device 1000 provides connection information for connection with the speaker system and the lighting fixture to the TV. In operation S2708, the host device 1000 connects with the TV.

In operation S2710, the TV connects with the speaker system based on the connection information, and in operation S2712, the TV connects with the lighting fixture based on the connection information.

In operation S2714, the host device 1000 obtains applications to control the connected surrounding devices. The host device 1000 may provide the ID values of the TV, the speaker system, and the lighting fixture to the server 4000, and may obtain applications to control the TV, the speaker system, and the lighting fixture from the server 4000.

In operation S2716, the host device 1000 provides the application to control the speaker system and the application to control the lighting fixture to the TV.

The application to control the TV, the main surrounding device, may be installed in the host device 1000, and the application to control the speaker system and the application to control the lighting fixture may be installed in the TV.

In operation S2718, the host device 1000 provides a control command for controlling the TV to the TV. The control command for controlling the TV may be obtained from the application to control the TV but one or more exemplary embodiments are not limited thereto. The TV may control its operation or operations of the speaker system and the lighting fixture, based on the control command from the host device 1000.

In operation S2720, the TV provides a control command for controlling the speaker system to the speaker system. The TV may transmit the control command to the speaker system by using the application to control the speaker system, based on the control command from the host device 1000. The control command for controlling the speaker system may be obtained from the application to control the speaker system but one or more exemplary embodiments are not limited thereto.

In operation S2722, the TV provides a control command for controlling the lighting fixture to the lighting fixture. The TV may transmit the control command to the lighting fixture by using the application to control the lighting fixture, based on the control command from the host device 1000. The control command for controlling the lighting fixture may be obtained from the application to control the lighting fixture but one or more exemplary embodiments are not limited thereto.

In operation S2724, the TV may reproduce the moving picture based on the control command from the host device 1000. The TV may receive the moving picture from the host device 1000 and may display the moving picture on a screen of the TV.

In operation S2726, the speaker system may output voice data based on the control command from the TV. The speaker system may receive the voice data of the moving picture from the TV and may output the received voice data.

In operation S2728, the lighting fixture may turn on its power and may adjust its output, based on the control command from the TV.

In the exemplary embodiment of FIG. 27, the TV connects with the speaker system and the lighting fixture, but one or more exemplary embodiments are not limited thereto. For example, the TV may connect with a washing machine and a telephone in the house which obstruct reproduction of the moving picture. That is, the washing machine or telephone may interrupt the user's ability to properly hear the sound being reproduced by the TV. In this case, at least one of the host device 1000 and the TV may turn off a power of the washing machine and may reduce a volume of the telephone or may switch a mode of the telephone into a vibration mode.

Figure 28:
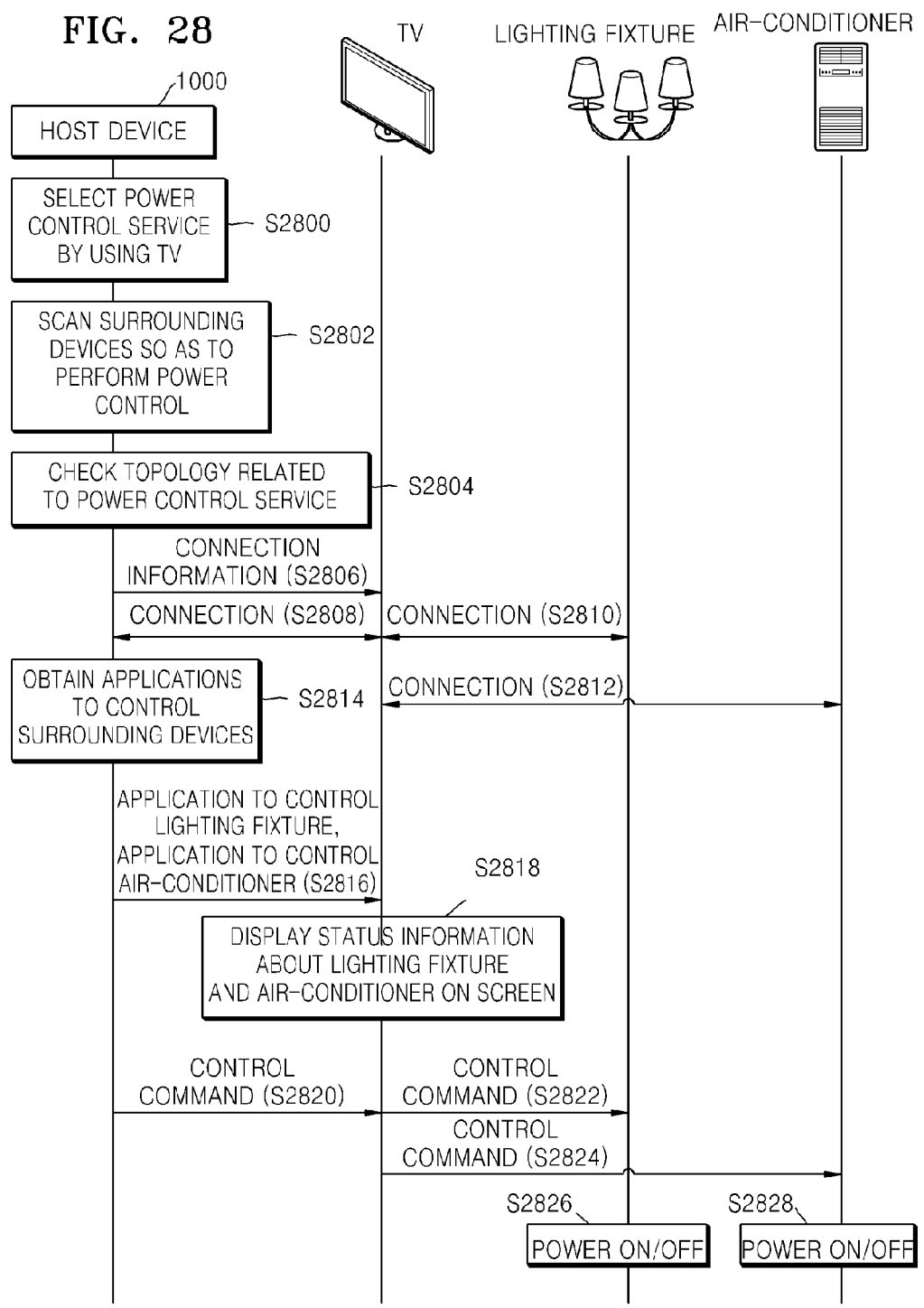
FIG. 28 illustrates an example in which the host device provides a service of controlling the power of surrounding devices in a house, according to an exemplary embodiment.

FIG. 28 illustrates an example in which the host device 1000 provides a service of controlling a power of surrounding devices in a house, according to an exemplary embodiment.

In operation S2800, the host device 1000 selects a "power control service by using TV". Various services that are of use to a user may be displayed on a screen of the host device 1000, and the host device 1000 may select the "power control service by using TV" based on a user input.

In operation S2802, the host device 1000 scans one or more surrounding devices so as to perform a power control. The host device 1000 may scan a TV, a lighting fixture, and an air-conditioner as the surrounding devices in the house which are related to the power control service. The host device 1000 may scan various surrounding devices in the house, and may select the TV, the lighting fixture, and the air-conditioner as the surrounding devices related to the power control service from among the scanned surrounding devices, but one or more exemplary embodiments are not limited thereto.

In operation S2804, the host device 1000 checks a topology related to the power control service. The host device 1000 may check topology configuration standards with respect to the topology related to the power control service, may connect the host device with the TV, and may determine to connect the TV with the lighting fixture and the air-conditioner.

In operations S2802 and S2804, the host device 1000 scans the surrounding devices and then determines connection relations among the surrounding devices, but one or more exemplary embodiments are not limited thereto. In another exemplary embodiment, the host device 1000 may check the topology configuration standards with respect to the topology related to the power control service, and then may scan the TV, the lighting fixture, and the air-conditioner in the house based on the topology configuration standards.

Also, the host device 1000 may scan the various surrounding devices in the house, and may provide a plurality of pieces of surrounding device information about the scanned surrounding devices and information about a context (selection of the power control service) of the host device 1000 to the server 4000, and then the server 4000 may determine to include the TV, the lighting fixture, and the air-conditioner in the topology. In this case, the host device 1000 may receive ID values of the TV, the lighting fixture, and the air-conditioner and information about connection relations therebetween from the server 4000.

In operation S2806, the host device 1000 provides connection information for connection with the lighting fixture and the air-conditioner to the TV. In operation S2808, the host device 1000 connects with the TV.

In operation S2810, the host device 1000 connects with the lighting fixture based on the connection information, and in operation S2812, the TV connects with the air-conditioner based on the connection information.

In operation S2814, the host device 1000 obtains applications to control the connected surrounding devices. The host device 1000 may provide the ID values of the TV, the lighting fixture, and the air-conditioner to the server 4000, and may obtain applications to control the TV, the lighting fixture, and the air-conditioner from the server 4000.

In operation S2816, the host device 1000 provides the application to control the lighting fixture and the application to control the air-conditioner to the TV.

The application to control the TV may be installed in the host device 1000, and the application to control the lighting fixture and the application to control the air-conditioner may be installed in the TV.

In operation S2818, the TV displays a status of the lighting fixture and a status of the air-conditioner on a screen of the TV. The TV may display the statuses of the lighting fixture and the air-conditioner on the screen of the TV, by using the application to control the lighting fixture and the application to control the air-conditioner.

In operation S2820, the host device 1000 provides a control command for controlling the TV to the TV. A user of the host device 1000 may control the control command from the host device 1000 to be transmitted to the TV, based on the statuses of the lighting fixture and the air-conditioner on the screen of the TV. The control command for controlling the TV may be obtained from the application to control the TV, but one or more exemplary embodiments are not limited thereto. The TV may control an operation of the TV or operations of the lighting fixture and the air-conditioner, in response to the control command from the host device 1000.

In operation S2822, the TV provides a control command for controlling the lighting fixture to the lighting fixture. The TV may transmit the control command to the lighting fixture by using the application to control the lighting fixture, based on the control command from the host device 1000. The control command for controlling the lighting fixture may be obtained from the application to control the lighting fixture but one or more exemplary embodiments are not limited thereto.

In operation S2824, the TV provides a control command for controlling the air-conditioner to the air-conditioner. The TV may transmit the control command to the air-conditioner by using the application to control the air-conditioner, based on the control command from the host device 1000. The control command for controlling the air-conditioner may be obtained from the application to control the air-conditioner but one or more exemplary embodiments are not limited thereto.

In operation S2826, the lighting fixture may turn on or off its power, based on the control command from the TV.

In operation S2828, the air-conditioner may turn on or off its power, based on the control command from the TV.

Figure 29:
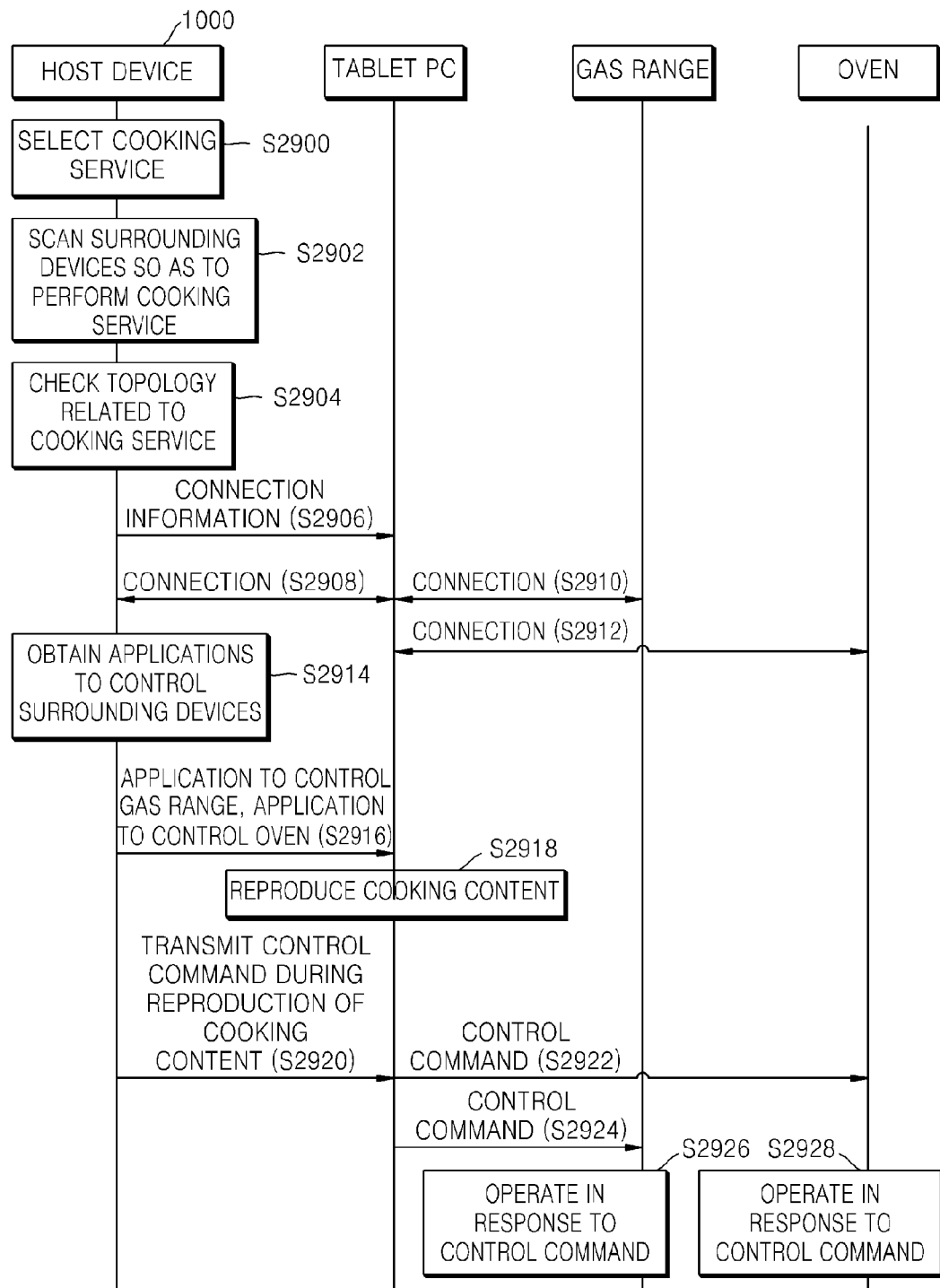
FIG. 29 illustrates an example in which surrounding devices are connected to and controlled by the host device according to a topology, when the host device executes a cooking service, according to an exemplary embodiment.

FIG. 29 illustrates an example in which surrounding devices are connected to, and controlled by, the host device 1000 according to a topology, when the host device 1000 executes a cooking service, according to an exemplary embodiment.

In operation S2900, the host device 1000 selects a "cooking service". Various services that are used by a user may be displayed on a screen of the host device 1000, and the host device 1000 may select the "cooking service", based on a user input.

In operation S2902, the host device 1000 scans one or more surrounding devices so as to perform the cooking service. The host device 1000 may scan a tablet PC, a gas range, and an oven as the surrounding devices in the house which are related to the cooking service. The host device 1000 may scan various surrounding devices in the house, and may select the tablet PC, the gas range, and the oven as the surrounding devices related to the cooking service from among the scanned surrounding devices, but one or more exemplary embodiments are not limited thereto.

In operation S2904, the host device 1000 checks a topology related to the cooking service. The host device 1000 may check topology configuration standards with respect to the topology related to the cooking service, may connect the host device with the tablet PC, and may determine to connect the tablet PC with the gas range and the oven.

In operations S2902 and S2904, the host device 1000 scans the surrounding devices and then determines connection relations among the surrounding devices, but one or more exemplary embodiments are not limited thereto. In another exemplary embodiment, the host device 1000 may check the topology configuration standards with respect to the topology related to the cooking service, and then may scan the tablet PC, the gas range, and the oven in the house based on the topology configuration standards.

Also, the host device 1000 may scan the various surrounding devices in the house, and may provide a plurality of pieces of surrounding device information about the scanned surrounding devices and information about a context (selection of the cooking service) of the host device 1000 to the server 4000, and then the server 4000 may determine to include the tablet PC with the gas range and the oven in the topology. In this case, the host device 1000 may receive ID values of the tablet PC with the gas range and the oven and information about connection relations therebetween from the server 4000.

In operation S2906, the host device 1000 provides connection information for connection with the gas range and the oven to the tablet PC. In operation S2908, the host device 1000 connects with the tablet PC.

In operation S2910, the tablet PC connects with the gas range based on the connection information, and in operation S2912, the tablet PC connects with the oven based on the connection information.

In operation S2914, the host device 1000 obtains applications to control the connected surrounding devices. The host device 1000 may provide the ID values of the tablet PC, the gas range, and the oven to the server 4000, and may obtain applications to control the tablet PC, the gas range, and the oven from the server 4000.

In operation S2916, the host device 1000 provides the application to control the gas range and the application to control the oven to the tablet PC.

The application to control the tablet PC may be installed in the host device 1000, and the application to control the gas range and the application to control the oven may be installed in the tablet PC.

In operation S2918, the tablet PC reproduces cooking content related to cooking procedures. The cooking content may be provided from the host device 1000 to the tablet PC but one or more exemplary embodiments are not limited thereto, thus, the cooking content may be provided from the server 4000 to the tablet PC. Also, the cooking content may be a moving picture showing a cooking procedure with respect to a dish but one or more exemplary embodiments are not limited thereto.

The tablet PC displays a status of the gas range and a status of the oven on a screen of the tablet PC. The tablet PC may display the statuses of the gas range and the oven on the screen of the tablet PC by using the application to control the gas range and the application to control the oven.

In operation S2920, the host device 1000 provides a control command for controlling the tablet PC to the tablet PC. The user of the host device 1000 may control the control command to be transmitted from the host device 1000 to the tablet PC so as to cook the dish, based on the cooking content and the statuses of the gas range and the oven which are displayed on the screen of the tablet PC. The control command for controlling the tablet PC may be obtained from the application to control the tablet PC but one or more exemplary embodiments are not limited thereto. Also, the tablet PC may control its operation or operations of the gas range and the oven, based on the control command from the host device 1000.

In operation S2922, the tablet PC provides a control command for controlling the gas range to the gas range. The tablet PC may transmit the control command to the gas range by using the application to control the gas range, based on the control command from the host device 1000. The control command for controlling the gas range may be obtained from the application to control the gas range, but one or more exemplary embodiments are not limited thereto.

In operation S2924, the tablet PC provides a control command for controlling the oven to the oven. The tablet PC may transmit the control command to the oven by using the application to control the oven, based on the control command from the host device 1000. The control command for controlling the oven may be obtained from the application to control the oven, but one or more exemplary embodiments are not limited thereto.

In operation S2926, the gas range may operate in response to the control command from the tablet PC.

In operation S2928, the oven may operate in response to the control command from the tablet PC.

Figure 30:
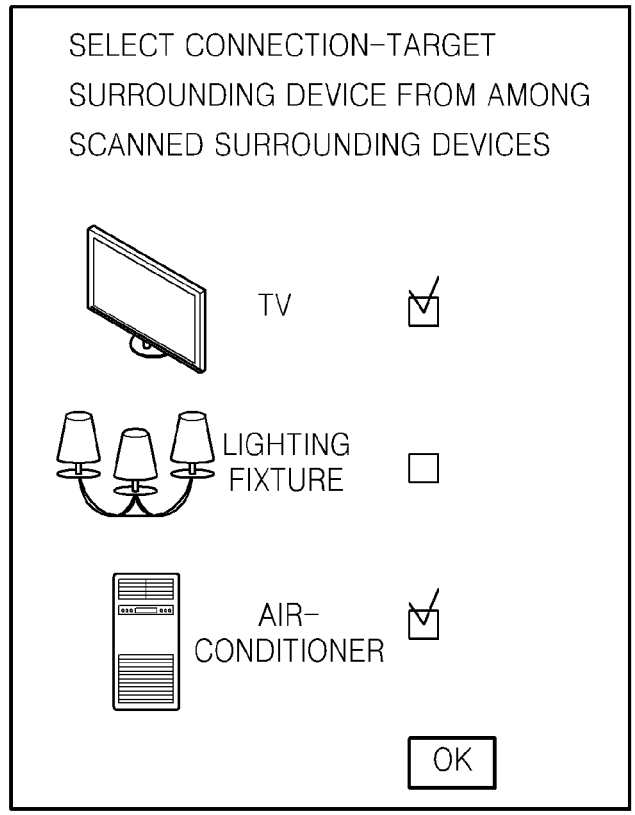
FIG. 30 illustrates an example in which a control-target surrounding device from among surrounding devices that are scanned by the host device is selected by a user input, according to an exemplary embodiment.

FIG. 30 illustrates an example in which a control-target surrounding device from among surrounding devices that are scanned by the host device 1000 is selected by a user input, according to an exemplary embodiment.

Referring to FIG. 30, the host device 1000 may scan the surrounding devices and may display, on its screen, a selection list for receiving an input for selecting at least one device from among the scanned surrounding devices. Also, the host device 1000 may select some or all of the scanned surrounding devices, based on a user input. The host device 1000 may scan the surrounding devices based on a context of the host device 1000 and topology setting information, but one or more exemplary embodiments are not limited thereto.

Figure 31:
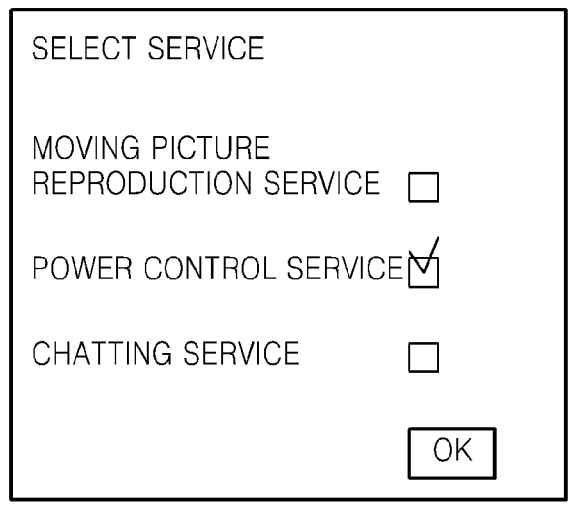
FIG. 31 illustrates an example in which a service to be executed by the host device is selected according to a user input, according to an exemplary embodiment.

FIG. 31 illustrates an example in which a service to be executed by the host device 1000 is selected according to a user input, according to an exemplary embodiment.

Referring to FIG. 31, the host device 1000 may display, on its screen, a list of services that the host device 1000 may provide. Also, the host device 1000 may select a service based on a user input. The service selected by the host device 1000 may be used in determining surrounding devices that are connected to the host device 1000.

Figure 32:
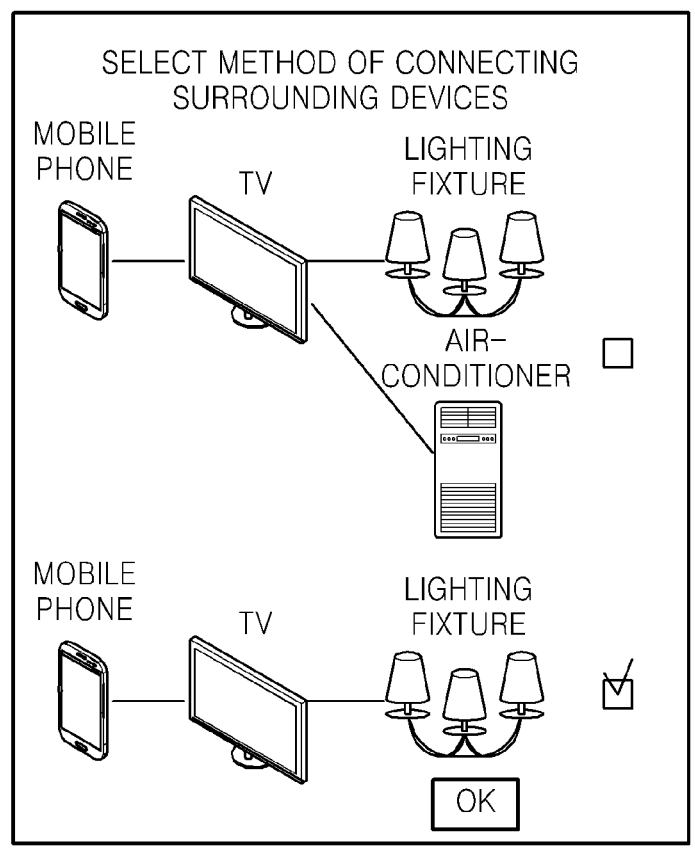
FIG. 32 illustrates an example in which one of topologies recommended by the host device is selected based on a user input, according to an exemplary embodiment.

FIG. 32 illustrates an example in which one of topologies recommended by the host device 1000 is selected based on a user input, according to an exemplary embodiment.

Referring to FIG. 32, the host device 1000 may recommend the topologies to a user, based on a context of the host device 1000, scanned surrounding devices, and topology setting information. The host device 1000 may display, on its screen, a picture showing connection relations among the host device 1000 and surrounding devices which are to configure the topologies, and may select a topology based on a user input.

Figure 33:
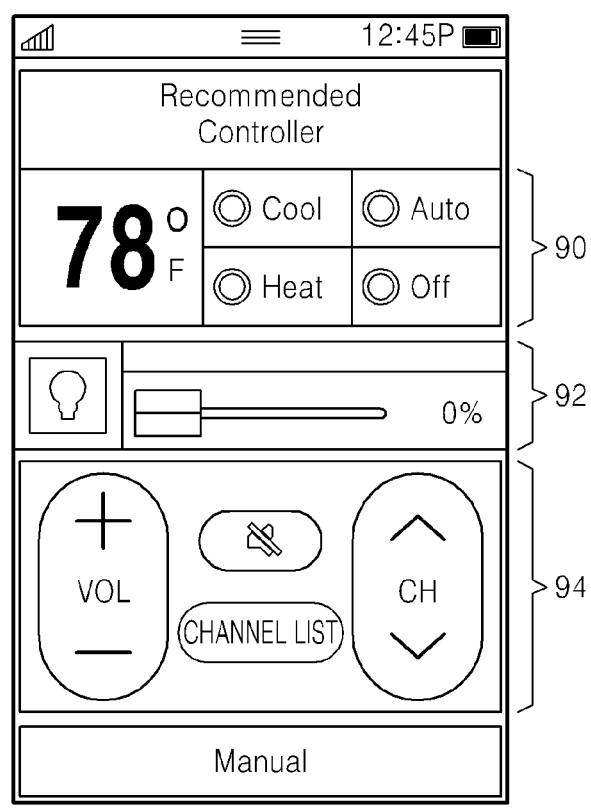
FIG. 33 illustrates a user interface (UI) for controlling surrounding devices, the UI is displayed on a screen of the host device, according to an exemplary embodiment.

FIG. 33 illustrates a UI for controlling surrounding devices, the UI displayed on a screen of the host device 1000, according to an exemplary embodiment.

In a case where the host device 1000 connects with a TV and the TV connects with a lighting fixture and an air-conditioner, a UI for controlling the TV, the lighting fixture, and the air-conditioner may be displayed on the screen of the host device 1000 as in FIG. 33. The UI for controlling the TV, the lighting fixture, and the air-conditioner may include an area 94 for controlling the TV, an area 92 for controlling the lighting fixture, and an area 90 for controlling the air-conditioner.

The host device 1000 may transmit a control command for controlling an operation of the TV to the TV, based on a user input via a button displayed in the area 94 for controlling the TV.

When the user touches the area 92 for controlling the lighting fixture, the host device 1000 may transmit a control command to the TV so as to allow the TV to control the lighting fixture.

When the user touches the area 90 for controlling the air-conditioner, the host device 1000 may transmit a control command to the TV so as to allow the TV to control the air-conditioner.

FIG. 34 illustrates an example in which a user interface for controlling surrounding devices is generated in the host device 1000, according to an exemplary embodiment.

Figure 34A:
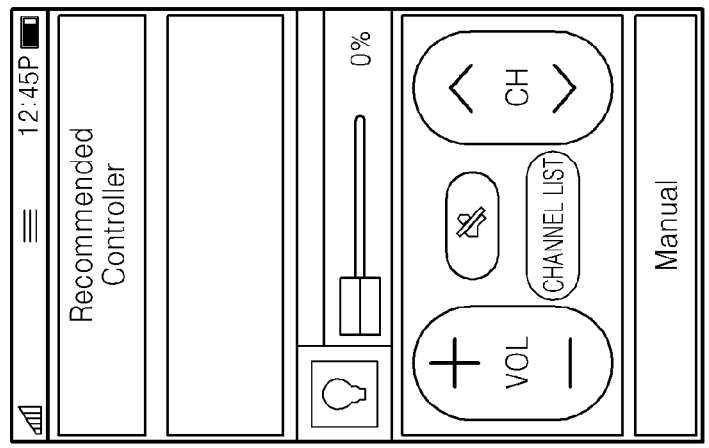
FIGS. 34A, 34B, and 34C illustrate examples in which a UI for controlling surrounding devices is generated in the host device, according to an exemplary embodiment.

Referring to FIG. 34A, a user may select some of a plurality of icons 10 indicating scanned surrounding devices, and may move the selected icons to a predetermined area 20. The surrounding devices that correspond to the icons moved to the predetermined area 20, and the host device 1000 may configure a topology.

Figure 34B:
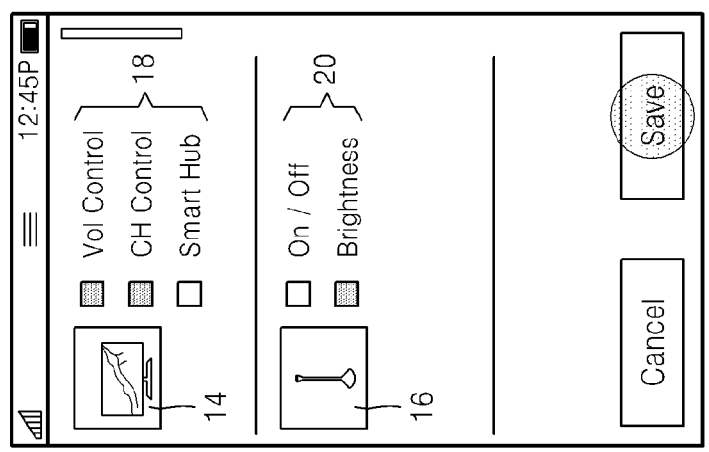

Also, as illustrated in FIG. 34B, the user may select a function from among a plurality of functions 18 and 20 of each of the selected surrounding devices.

Figure 34C:
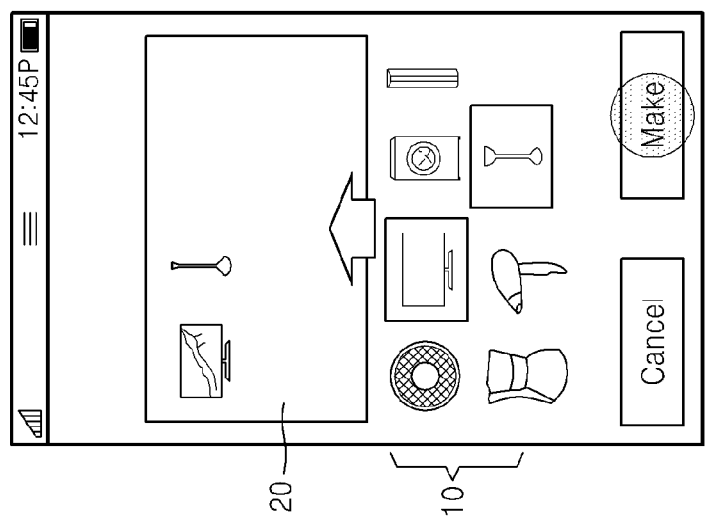

Also, as illustrated in FIG. 34C, a control UI including the surrounding devices and the functions that are selected by the user may be displayed on a screen of the host device 1000.

Figure 35:
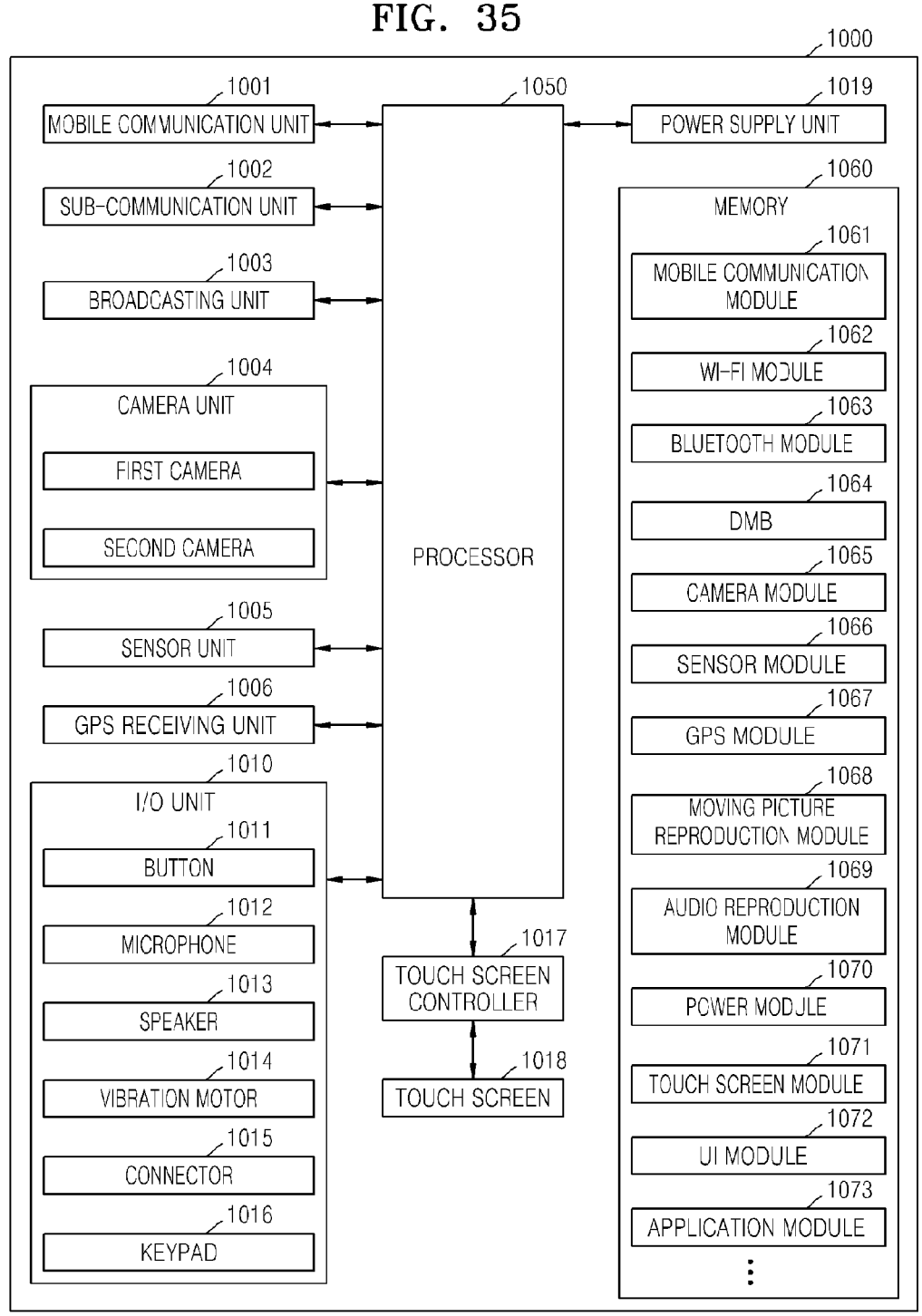
FIG. 35 is a block diagram of the host device, according to an exemplary embodiment.

FIG. 35 is a block diagram of the host device 1000, according to an exemplary embodiment.

A mobile communication unit 1001 performs a call setup, data communication, or the like with a base station via a cellular network such as a third generation (3G)/fourth generation (4G) network. A sub-communication unit 1002 performs a function for short-distance communication such as Bluetooth or NFC. A broadcasting unit 1003 receives a Digital Multimedia Broadcasting (DMB) signal.

A camera unit 1004 includes a lens and optical elements used to capture a still image or a moving picture.

A sensor unit 1005 may include a gravity sensor for sensing motion of the host device 1000, an illuminance sensor for sensing intensity of light, a proximity sensor for sensing proximity of a person, a motion sensor for sensing motion of a person, or the like.

A global positioning system (GPS) receiving unit 1006 receives a GPS signal from a satellite. By using the GPS signal, various services may be provided to a user.

An input/output (I/O) unit 1010 provides an interface for an external device or a person, and includes a button 1011, a microphone 1012, a speaker 1013, a vibration motor 1014, a connector 1015, and a keypad 1016.

A touch screen 1018 receives a touch input by the user. A touch screen controller 1017 transfers, to a control unit (also referred as the processor) 1050, a touch input that is input via the touch screen 1018. A power supply unit 1019 is connected to a battery or an external power source so as to supply power for the device.

The processor 1050 establishes a wireless local area network (LAN) link by executing programs stored in a memory 1060.

The programs stored in the memory 1060 may be divided into a plurality of modules according to their functions. That is, the programs stored in the memory 1060 may be divided into a mobile communication module 1061, a Wi-Fi module 1062, a Bluetooth module 1063, a DMB module 1064, a camera module 1065, a sensor module 1066, a GPS module 1067, a moving picture reproduction module 1068, an audio reproduction module 1069, a power module 1070, a touch screen module 1071, a user interface (UI) module 1072, an application module 1073, or the like. Although not illustrated in FIG. 35, the memory 1060 may further include various communication modules including a BLE module (not shown).

Functions of the modules may be intuitively deduced from their respective titles, by one of ordinary skill in the art, and thus, only the application module 1073 is described below. The application module 1073 allows the host device 1000 to configure a topology with surrounding devices around the host device 1000 and to control the surrounding devices.

The application module 1073 may scan the surrounding devices by using at least one of the mobile communication unit 1001 and the sub-communication unit 1002, and may determine the main surrounding device 2000 and the sub surrounding device 3000 to be included in the topology from among the scanned surrounding devices. The application module 1073 may determine a context of the host device 1000 by using the modules included in the memory 1060, and may generate context information about the context of the host device 1000. Also, the application module 1073 may determine the topology and the surrounding devices to be included in the topology, according to the context of the host device 1000.

The application module 1073 may obtain connection information for connection with each of the main surrounding device 2000 and the sub surrounding device 3000, and may control the host device 1000, the main surrounding device 2000, and the sub surrounding device 3000 to be connected to each other, by using the connection information.

The application module 1073 may obtain an application to control the main surrounding device 2000 from the main surrounding device 2000 or the server 4000, and may install the application in the host device 1000. Also, the application module 1073 may obtain an application to control the sub surrounding device 3000 from the sub surrounding device 3000 or the server 4000, and may provide the application to the main surrounding device 2000.

The application module 1073 may control the main surrounding device 2000 and the sub surrounding device 3000 by using the application to control the main surrounding device 2000 and the application to control the sub surrounding device 3000.

The application module 1073 may determine whether the context of the host device 1000 is changed, by using the modules in the memory 1060, and may generate context information about the changed context. The application module 1073 may change the topology based on the changed context, and may connect the host device 1000 and the surrounding devices according to the changed topology.

Although the application module 1073 is described above in a general way, functions of the application module 1073 are not limited thereto, and the functions of the application module 1073 in detail may be derived with reference to FIGS. 3 through 34.

Figure 36:
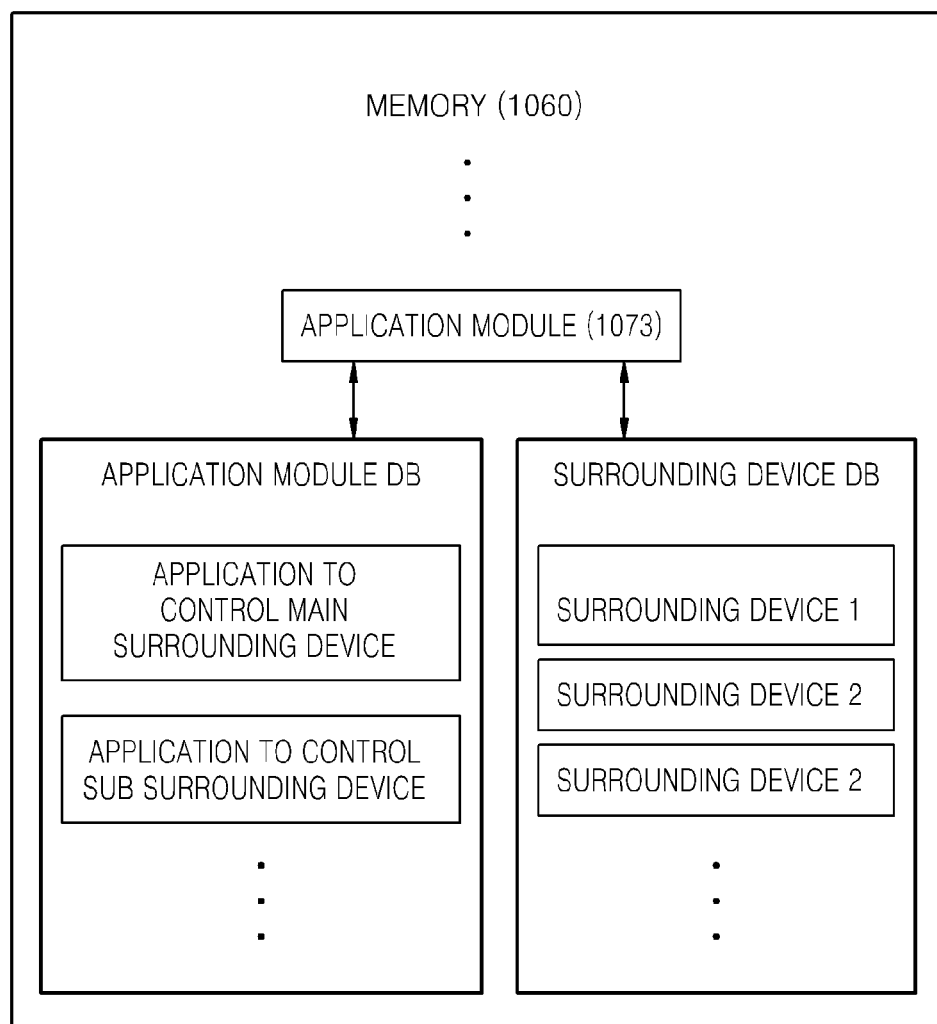
FIG. 36 illustrates an application database (DB) and a surrounding device DB included in a memory, according to an exemplary embodiment.

FIG. 36 illustrates an application module DB and a surrounding device DB included in the memory 1060, according to an exemplary embodiment.

As illustrated in FIG. 36, the application module 1073 in the memory 1060 may be connected to the application module DB and the surrounding device DB.

The application module DB may store an application to control the main surrounding device 2000 and an application to control the sub surrounding device 3000. Also, when a topology is configured, at least one of the application to control the main surrounding device 2000 and the application to control the sub surrounding device 3000 may be provided from at least one of the main surrounding device 2000, the sub surrounding device 3000, and the server 4000 to the host device 1000, but one or more exemplary embodiments are not limited thereto.

The application module 1073 may control the main surrounding device 2000 and the sub surrounding device 3000 by using the application to control the main surrounding device 2000 and the application to control the sub surrounding device 3000, respectively. In particular, the application module 1073 may provide the application to control the sub surrounding device 3000 to the main surrounding device 2000, and the main surrounding device 2000 may control the sub surrounding device 3000 by using the application to control the sub surrounding device 3000 in response to a control command from the application module 1073.

Figure 37:
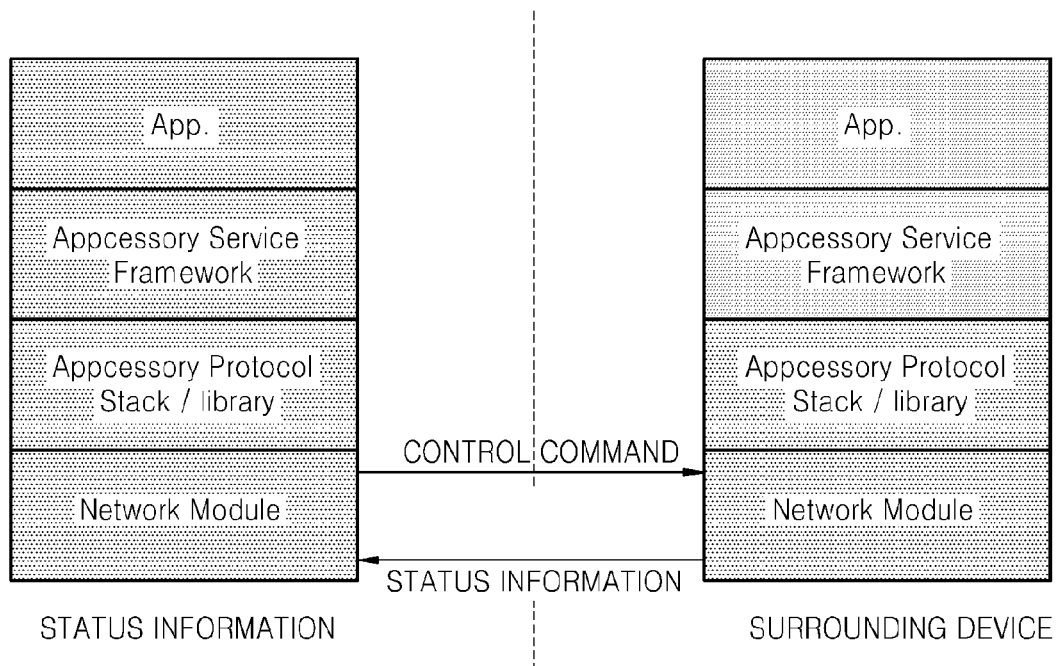
FIG. 37 illustrates an example in which a control command and status information are exchanged between the host device and a surrounding device, according to an exemplary embodiment.

FIG. 37 illustrates an example in which a control command and status information are exchanged between the host device 1000 and a surrounding device, according to an exemplary embodiment.

Referring to FIG. 37, the host device 1000 may include an application, an appcessory service framework, an appcessory protocol stack/library, and a network module. Here, the term "appcessory" may mean the surrounding device 2000 which is connected to the host device 1000. The surrounding device may include an application, an appcessory service framework, an appcessory protocol stack/library, and a network module. The application of the host device 1000 and the application of the surrounding device may be used in topology configuration and device control. Also, the appcessory service may include a topology configuration service and a device control service that are provided according to one or more exemplary embodiments. Also, the appcessory protocol may be used in the topology configuration service and the device control service.

The network module included in the host device 1000 and the network module included in the surrounding device may exchange data, and by doing so, a control command generated by the host device 1000 may be transmitted to the surrounding device, and status information about the surrounding device may be transmitted to the host device 1000.

The one or more exemplary embodiments may be embodied as a recording medium, e.g., a program module to be executed in computers, which include computer-readable commands. The computer storage medium may include any usable medium that may be accessed by computers, volatile and non-volatile medium, and detachable and non-detachable medium. Also, the computer storage medium may include a computer storage medium and a communication medium. The computer storage medium includes all of volatile and non-volatile medium, and detachable and non-detachable medium which are designed to store information including computer readable commands, data structures, program modules or other data. The communication medium includes computer-readable commands, a data structure, a program module, and other transmission mechanisms, and includes other information transmission mediums.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments. For example, configuring elements that are singular forms may be executed in a distributed fashion, and also, configuring elements that are distributed may be combined and then executed.

While the application has been particularly shown and described with reference to exemplary embodiments thereof, it will be understood by those of ordinary skill in the art that various changes in form and details may be made therein without departing from the spirit and scope of the exemplary embodiments as defined by the following claims.

What is claimed is:

1. A method of controlling sub surrounding devices, the method performed by a main surrounding device and comprising:
receiving a plurality of pieces of surrounding device information regarding the sub surrounding devices, from a host device;
receiving context information, from the host device;
obtaining topology setting information regarding topology configuration standards;
determining at least one sub surrounding device to be configured in a topology, among the sub surrounding devices, based on the plurality of pieces of the surrounding device information, the context information, and the topology setting information; and
controlling the at least one sub surrounding device, based on control information that is received from the host device.

2. The method of claim 1, wherein the context information comprises information about a type of content that is executed in the host device, and
wherein the topology setting information comprises information about a type of a surrounding device to be configured in the topology, and information about connection relationships among the host device, the main surrounding device, and the at least one sub surrounding device, according to the type of the content.

3. The method of claim 1, wherein the context information comprises information about a type of a service to be provided by the host device, and
wherein the topology setting information comprises information about a type of a surrounding device to be configured in the topology, and information about connection relationships among the host device, the main surrounding device, and the at least one sub surrounding device, according to the type of the service.

4. The method of claim 1, wherein the context information comprises information about a user of the host device, and
wherein the topology setting information comprises information about a type of a surrounding device to be configured in the topology, and information about connection relationships among the host device, the main surrounding device, and the at least one sub surrounding device, according to the user.

5. The method of claim 1, wherein the topology setting information comprises information about a type of a surrounding device to be configured in the topology, and information about connection relationships among the host device, the main surrounding device, and the at least one sub surrounding device, according to an attribute of the main surrounding device.

6. The method of claim 1, further comprising:
receiving application information about an application to control the at least one sub surrounding device, from the host device; and
installing the application in the main surrounding device, based on the application information,
wherein the controlling of the at least one sub surrounding device comprises controlling the at least one sub surrounding device, based on the application.

7. The method of claim 1, wherein the topology setting information comprises information regarding the topology configuration standards configuring the topology, according to functions of the main surrounding device and the at least one sub surrounding device, and
wherein the determining of the at least one sub surrounding device to be configured in the topology comprises determining the at least one sub surrounding device to be configured in the topology, according to the functions of the main surrounding device and the at least one sub surrounding device.

8. The method of claim 1, further comprising:
in response to the at least one sub surrounding device connected to the host device being changed, checking a topology comprising the changed sub surrounding device;
connecting the main surrounding device with the changed sub surrounding device, based on the topology comprising the changed sub surrounding device; and
controlling the changed sub surrounding device.

9. The method of claim 1, further comprising:
receiving firmware of the at least one sub surrounding device corresponding to a function of the at least one sub surrounding device, from a server via the host device; and
providing the firmware to the at least one sub surrounding device.

10. The method of claim 9, wherein the function of the at least one sub surrounding device is determined based on connection relationships among the host device, the main surrounding device, and the at least one sub surrounding device.

11. A method of controlling surrounding devices, the method performed by a host device and comprising:
scanning the surrounding devices;
determining a main surrounding device and at least one sub surrounding device to be configured in a topology, among the surrounding devices, based on topology configuration standards matching a context of the host device;
transmitting a plurality of pieces of surrounding device information regarding the at least one sub surrounding device, to the main surrounding device;
transmitting context information to the main surrounding device; and
controlling the main surrounding device and the at least one sub surrounding device.

12. The method of claim 11, wherein the context of the host device comprises a type of content that is executed in the host device, and
wherein the topology configuration standards comprise standards about a type of a surrounding device to be configured the topology, and standards about connection relationships among the host device, the main surrounding device, and the at least one sub surrounding device, according to the type of the content.

13. The method of claim 11, wherein the context of the host device comprises a type of a service to be provided by the host device, and
wherein the topology configuration standards comprise standards about a type of a surrounding device to be configured in the topology, and standards about connection relationships among the host device, the main surrounding device, and the at least one sub surrounding device, according to the type of the service.

14. The method of claim 11, wherein the context of the host device comprises a user of the host device, and
wherein the topology configuration standards comprise standards about a type of a surrounding device to be configured in the topology, and standards regarding connection relationships among the host device, the main surrounding device, and the at least one sub surrounding device, according to the user.

15. The method of claim 11, wherein the topology configuration standards comprise standards about a type of a surrounding device to be configured in the topology, and standards about connection relationships among the host device, the main surrounding device, and the at least one sub surrounding device, according to an attribute of the main surrounding device.

16. The method of claim 11, further comprising:
receiving an application to control the main surrounding device, from a server; and
installing the application to control the main surrounding device, in the host device,
wherein the main surrounding device is controlled by the host device, based on the received application.

17. The method of claim 16, further comprising providing application information about an application to control the at least one sub surrounding device, to the main surrounding device,
wherein the application to control the at least one sub surrounding device is installed in the main surrounding device, based on the application information.

18. The method of claim 11, wherein the topology configuration standards configure the topology, according to functions of the main surrounding device and the at least one sub surrounding device, and
wherein the determining of the at least one sub surrounding device to be configured in the topology comprises determining the at least one sub surrounding device to be configured in the topology, according to the functions of the main surrounding device and the at least one sub surrounding device.

19. The method of claim 11, further comprising:
in response to the at least one sub surrounding device connected to the host device being changed, checking a topology comprising the changed sub surrounding device; and
connecting the main surrounding device and the changed sub surrounding device, based on the topology comprising the changed sub surrounding device.

20. A host device comprising:
a memory configured to store at least one program; and
a processor configured to configure a topology with surrounding devices, and control the surrounding devices by executing the at least one program,
wherein the at least one program comprises commands to:
scan the surrounding devices;
determine a main surrounding device and at least one sub surrounding device to be configured in a topology, among the surrounding devices, based on topology configuration standards matching a context of the host device;
transmit a plurality of pieces of surrounding device information regarding the at least one sub surrounding device, to the main surrounding device;
transmit context information to the main surrounding device; and
control the main surrounding device and the at least one sub surrounding device.

* * * * *